US011620669B2

(12) United States Patent
Sundaram et al.

(10) Patent No.: US 11,620,669 B2
(45) Date of Patent: *Apr. 4, 2023

(54) SYSTEM AND METHOD FOR A DIGITAL COIN EXCHANGE

(71) Applicant: Alef Edge, Inc., Bernardsville, NJ (US)

(72) Inventors: Ganapathy Subramanian Sundaram, Hillsborough, NJ (US); Ian Patrick Bennett, New York, NY (US)

(73) Assignee: Alef Edge, Inc., Bernardsville, NJ (US)

( * ) Notice: Subject to any disclaimer, the term of this patent is extended or adjusted under 35 U.S.C. 154(b) by 1 day.

This patent is subject to a terminal disclaimer.

(21) Appl. No.: 17/500,438

(22) Filed: Oct. 13, 2021

(65) Prior Publication Data

US 2022/0044273 A1    Feb. 10, 2022

Related U.S. Application Data

(63) Continuation of application No. 16/451,800, filed on Jun. 25, 2019, now Pat. No. 11,182,819.

(51) Int. Cl.
G06Q 30/02       (2012.01)
G06Q 30/0226     (2023.01)
G06Q 20/38       (2012.01)
G06Q 20/06       (2012.01)
G06Q 30/0241     (2023.01)
G06Q 20/36       (2012.01)

(52) U.S. Cl.
CPC ..... G06Q 30/0226 (2013.01); G06Q 20/0658 (2013.01); G06Q 20/3678 (2013.01); G06Q 20/389 (2013.01); G06Q 30/0277 (2013.01)

(58) Field of Classification Search
CPC ........... G06Q 30/0226; G06Q 20/0658; G06Q 20/3678; G06Q 20/389; G06Q 30/0277
See application file for complete search history.

(56) References Cited

U.S. PATENT DOCUMENTS

| 5,794,210 A | 8/1998 | Goldhaber et al. |
| 9,147,188 B2 | 9/2015 | Dharmapalan |
| 10,269,009 B1 * | 4/2019 | Winklevoss ........... G06Q 20/36 |

(Continued)

OTHER PUBLICATIONS

"MAD," Whitepaper 1.2, https://madnetwork.com/whitepaper.

(Continued)

Primary Examiner — Eric R Netzloff
(74) Attorney, Agent, or Firm — DLA Piper LLP (US)

(57) ABSTRACT

Systems and methods for digital coin exchange. A digital coin platform receives a distribution request from an entity server comprising digital multimedia content associated with an entity. Digital coins are created responsive to the request. Each digital coin comprises a first coin associated with the entity and a second coin associated with consumers. The first and second coins are linked via linking information. The first coins are transferred to the entity server. A consumption request including the digital multimedia content is transmitted to a consumer device. Responsive to an indication that the content is at least partially consumed via the consumer device, one or more second coins are transferred to the consumer device. The digital coins and the transferred first and second coins are recorded. The transferred second coins permit the consumer device to perform transactions associated with the entity.

28 Claims, 7 Drawing Sheets

(56) References Cited

U.S. PATENT DOCUMENTS

| | | |
|---|---|---|
| 2003/0136431 A1 | 7/2003 | Scranton et al. |
| 2004/0107146 A1* | 6/2004 | Alfano ............... G06Q 30/0601 |
| | | 705/26.35 |
| 2006/0206376 A1 | 9/2006 | Gibbs et al. |
| 2007/0293155 A1* | 12/2007 | Liao ..................... G06Q 20/326 |
| | | 455/41.2 |
| 2009/0006188 A1* | 1/2009 | Guo ................... G06Q 30/0239 |
| | | 705/14.27 |
| 2009/0070219 A1 | 3/2009 | D'Angelo et al. |
| 2010/0122274 A1 | 5/2010 | Gillies et al. |
| 2011/0010238 A1 | 1/2011 | Postrel |
| 2011/0166917 A1 | 7/2011 | Shang et al. |
| 2012/0109756 A1* | 5/2012 | Kim ................... G06Q 30/0269 |
| | | 705/14.66 |
| 2012/0271717 A1 | 10/2012 | Postrel |
| 2012/0310838 A1* | 12/2012 | Harris ................ G06Q 20/3276 |
| | | 705/65 |
| 2013/0226712 A1 | 8/2013 | Lietsalmi |
| 2013/0339124 A1 | 12/2013 | Postrel |
| 2014/0100943 A1 | 4/2014 | Palihapitiya et al. |
| 2014/0122197 A1 | 5/2014 | Cheung et al. |
| 2014/0149196 A1* | 5/2014 | Drozd .................. G07F 7/0893 |
| | | 705/14.21 |
| 2014/0180815 A1 | 6/2014 | Chatwin et al. |
| 2014/0220927 A1* | 8/2014 | Girard ................ H04L 12/1475 |
| | | 455/405 |
| 2014/0310080 A1 | 10/2014 | Salmon et al. |
| 2014/0324629 A1 | 10/2014 | Jacobs |
| 2015/0269573 A1* | 9/2015 | Subbarao ........... G06Q 20/3821 |
| | | 705/44 |
| 2015/0310476 A1* | 10/2015 | Gadwa ............... G06Q 30/0226 |
| | | 705/14.27 |
| 2016/0012424 A1 | 1/2016 | Simon et al. |
| 2016/0042342 A1 | 2/2016 | Proctor, Jr. et al. |
| 2016/0283920 A1* | 9/2016 | Fisher ................. G06Q 20/065 |
| 2016/0283960 A1 | 9/2016 | Watanabe et al. |
| 2016/0343024 A1* | 11/2016 | Joshi .................... G06Q 20/367 |
| 2017/0161734 A1 | 6/2017 | Bankston et al. |
| 2018/0089644 A1* | 3/2018 | Chen ..................... G06Q 20/24 |
| 2018/0178128 A1 | 6/2018 | Onda et al. |
| 2019/0043050 A1* | 2/2019 | Smith ................. G06Q 20/223 |
| 2019/0108499 A1 | 4/2019 | Liu |
| 2019/0108542 A1 | 4/2019 | Durvasula et al. |
| 2019/0158606 A1 | 5/2019 | Guim Bernat et al. |
| 2019/0362392 A1* | 11/2019 | Kim ................... G06Q 20/3829 |
| 2022/0318852 A1* | 10/2022 | Blaikie, III ......... G06Q 30/0255 |

OTHER PUBLICATIONS

Goldin, Mike, Soleimani, Ameen, and Young, James, "*The AdChain Registry*," MetaXchain, Inc., May 31, 2017, https://adtoken.com/uploads/white-paper.pdf.

"BitRewards White Paper, Bringing Blockchain to Customers' Loyalty," BitRewards Shopping Becomes Mining, Dec. 30, 2017, https://bitrewards.network/wp.pdf.

\* cited by examiner

SYSTEM AND METHOD FOR A DIGITAL COIN EXCHANGE

TECHNICAL FIELD

The present disclosure relates generally to digital coins and digital advertising and, in particular, to systems and methods for a digital coin exchange, based on an electronic trading marketplace having tradable digital loyalty tokens that are electronically tracked.

BACKGROUND

Advertising is a form of promoting and marketing products and services to potential buyers. Digital advertising, in general is a difficult market to be efficient in. Over the mobile internet, for example, digital advertisements are often promoted in-application, through messaging (for example, short message service (SMS)) or through mobile browsers to users. However, a vast majority of the time, a relevance of promotions to internet subscribers is hard to determine in advance. Worse yet, even if a given digital advertisement was relevant, it may be more difficult to determine an impact of advertising after delivery. Moreover, digital advertisements often include active user participation (for instance, clicking on (i.e., selecting) a digital ad and paying for the data costs associated with delivery over a network, etc.).

Programmatic advertising along with targeting may offer techniques to alleviate relevance and matching of brands with subscribers in real-time; however, brands may be unable to determine how much of an impact (e.g., how to quantify the impact) their advertisement provided. As an example, even with programmatic advertising, brands cannot tell which digital advertisement created a call to action for a user to visit a store or their web site to buy products or a service. Subsequently, rewarding loyal customers who learned of a product or a product category and retaining such customers is also very difficult. In fact, loyalty programs are soaring and have become an important tool in customer retention strategies.

Conceptually, customer acquisition costs and customer retention costs may be tied to the same marketing budget. Hence, to a marketing executive looking to "do more with less," reducing both customer acquisition and retention costs simultaneously is often a huge imperative. However, techniques to reward loyalty may conflict with improving market efficiency of customer acquisition. In particular, rewarding the act of "paying to watch advertising" is often "ignored" in designing loyalty systems. Given that a vast majority of digital internet applications are monetized through advertisements, these problems need to be addressed with urgency.

There is a need for a system and method to improve digital marketing efficiency to mobile devices while rewarding customers for their efforts and loyalty.

SUMMARY

Aspects of the present disclosure relate to systems, methods and non-transitory computer readable mediums for a digital coin exchange. A system includes at least one entity server associated with an entity, at least one consumer device and a digital coin platform communicatively coupled to the at least one entity server and the at least one consumer device via at least one network. The digital coin platform includes at least one computer including non-transitory memory storing computer readable instructions and at least one processor configured to execute the computer readable instructions. The digital coin platform is configured to receive, via the at least one network, a distribution request from the at least one entity server. The distribution request includes digital multimedia content associated with the entity. The digital coin platform creates, responsive to the distribution request, one or more digital coins. Each digital coin comprises at least one first coin associated with the entity and at least one second coin associated with one or more consumers, with the at least one first coin being linked to the at least one second coin via linking information. The digital coin platform transfers one or more first coins of the at least one first coin to the at least one entity server. The digital coin platform transmits, via the at least one network, to the at least one consumer device, a consumption request including the digital multimedia content. Responsive to receiving an indication that the digital multimedia content is at least partially consumed via the at least one consumer device, the digital coin platform transfers one or more second coins of the least one second coin to the at least one consumer device. The digital coin platform records, on the digital coin platform, the created one or more digital coins, the transferred second coins, and the transferred first coins. The transferred second coins permit the at least one consumer device to perform transactions associated with the entity.

Aspects of the present disclosure also relate to a system for a digital coin exchange. The system includes a digital coin platform including at least one computer communicatively coupled to at least one network. The digital coin platform is configured to create one or more digital coins and to track the digital coins. Each digital coin includes at least one first coin associated with the entity and at least one second coin. The at least one first coin is linked to the at least one second coin via linking information, with the at least one second coin for performing digital coin transactions associated with the entity. The system also includes a consumer device configured to store one or more second coins of the at least one second coin received from the digital coin platform, a first transaction device associated with the entity and the at least one first coin and a second transaction device associated with a further entity different from the entity and not associated with the at least one first coin. When the consumer device initiates a first digital transaction with the first transaction device for at least one item associated with the entity, the first transaction device is configured to match the one or more second coins stored in the consumer device to the at least one first coin, and to complete the first digital transaction with at least a portion of the one or more second coins responsive to the match. When the consumer device initiates a second digital transaction with the second transaction device for at least one item associated with the further entity, the second transaction device is configured to obtain a portion of the at least one first coin based on a transaction with the first transaction device via the digital coin platform, match the one or more second coins stored in the consumer device to the obtained portion of the least one first coin, and to complete the second digital transaction with at least a portion of the one or more second coins responsive to the match.

DETAILED DESCRIPTION

Figure 1:
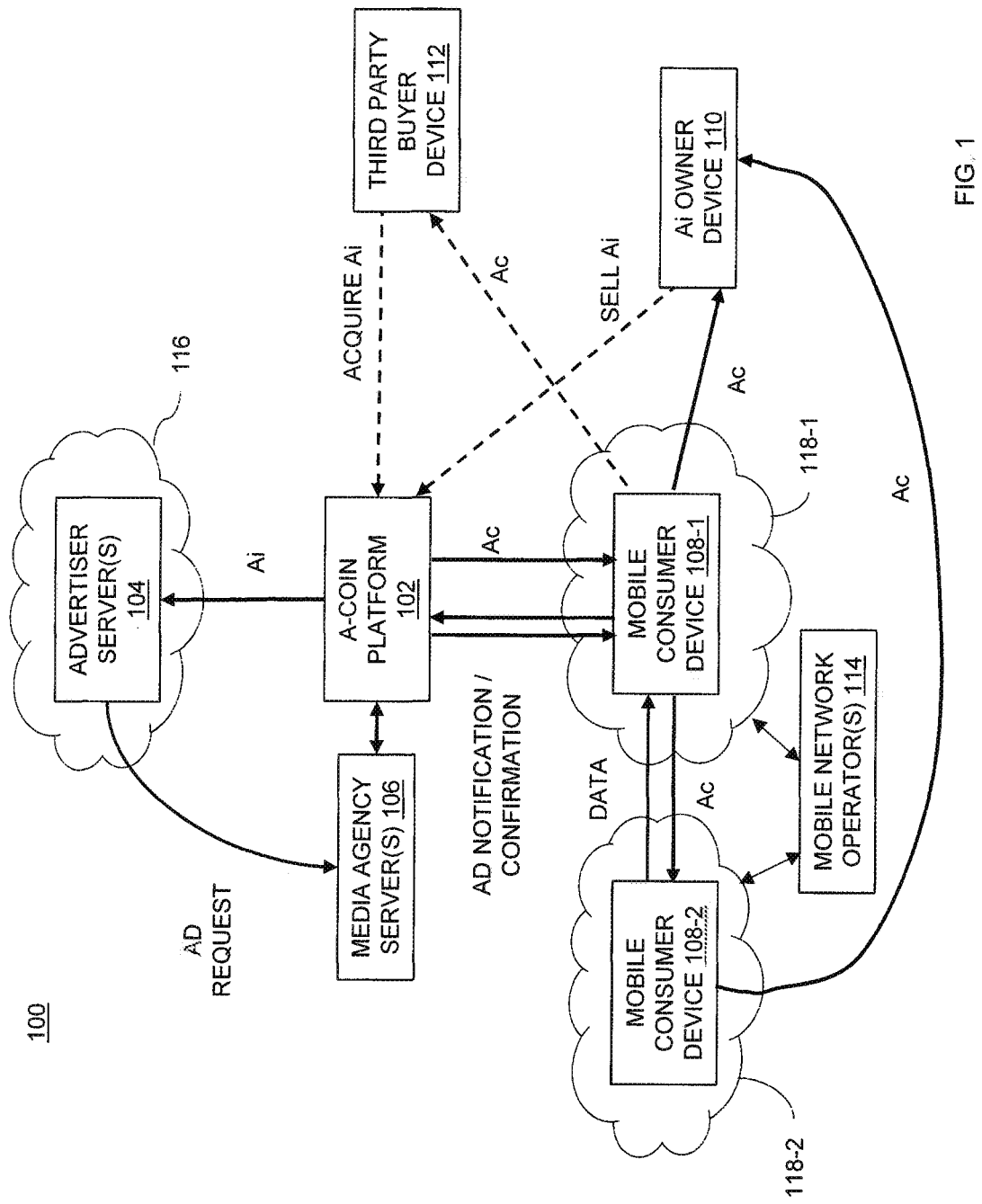
FIG. 1 is a functional block diagram of an example digital coin exchange environment including an example A-coin platform, according to an aspect of the present disclosure.

Aspects of the present disclosure generally relate to systems and methods of digital coin exchange and tracking. A digital coin exchange system may include at least one entity server associated with an entity, at least one mobile consumer device and a digital coin platform communicatively coupled to the at least one entity server and the at least one mobile consumer device via at least one network. The digital coin platform may be configured to receive a distribution request from the entity server(s) that includes digital multimedia content associated with the entity. The digital coin platform may create one or more digital coins responsive to the request. Each digital coin may include at least one first coin associated with the entity (e.g., Ai coin) and at least one second coin associated with one or more consumers (e.g., Ac coin). The first coin(s) may be linked to the second coin(s) via linking information. The digital coin platform may transfer one or more first coins (e.g., Ai coins) to the entity server(s). The digital coin platform may transmit a consumption request to the mobile consumer device including the digital multimedia content. Responsive to receiving an indication that the digital multimedia content is at least partially consumed by the mobile consumer device, the digital coin platform may transfer one or more second coins (e.g., Ac coins) to the mobile consumer device. The digital coin platform may also record, on a distributed ledger, the created one or more digital coins (e.g., A-coins), the transferred second coins (e.g., Ac coins), and the transferred first coins (e.g., Ai coins). The transferred second coins permit the mobile consumer device to perform transactions associated with the entity.

According to some aspects of the present disclosure, the mobile consumer device may perform first digital transactions with a first transaction device associated with the entity and the at least one first coin (for at least one item associated with the entity), and second digital transactions with a second transaction device associated with a further entity different from the entity and not associated with the at least one first coin (for at least one item associated with the further entity). The first digital transaction with the first transaction device may include the first transaction device matching the second coins stored in the mobile consumer device to the first coin, and completing the first digital transaction with at least a portion of the second coins responsive to the match. The second digital transaction with the second transaction device may include the second transaction device obtaining a portion of the first coin based on a transaction with the first transaction device via the digital coin platform, then matching the second coins stored in the mobile consumer device to the obtained portion of first coin, and completing the second digital transaction with at least a portion of the second coins responsive to the match.

One aspect of digital coin tracking of the present disclosure relates to tracking digital usage and effectiveness of digital advertising content across consumer devices and merchant devices with a distributed ledger network. In some examples, the digital coin exchange system may be part of an electronic trading marketplace, and the digital coins may be tradeable on the electronic trading marketplace. In some examples, the digital coins may be considered to be digital loyalty tokens that may be rewarded to users of consumer devices through their effort to view and/or listen to a digital marketing campaign. The digital loyalty tokens may be tradable on the electronic marketplace (e.g., for products and/or services). The digital coin exchange system may track the creation, distribution and usage of the digital loyalty tokens through the electronic trading marketplace, and use the tracking to determine (e.g., measure) a marketing efficiency of the digital advertising campaign. The determined efficiency may be used, for example, to adjust the current digital marketing and/or for the creation of future digital advertising campaigns.

According to some embodiments of the present disclosure, techniques and systems are provided that simultaneously improve digital marketing efficiency while rewarding customers for their efforts and loyalty. In the present disclosure a new type of digital record is created, referred to herein as an A-coin, which may be traded (e.g., used to perform transactions) in a new digital marketplace. As discussed below the A-coin system (also referred to herein as an A-coin platform) and digital marketplace (collectively referred to herein as a digital coin exchange environment) provides such improvements and advantages as noted herein.

In some embodiments of the digital coin exchange environment of the present disclosure, advertisers may send their digital multimedia content (e.g., digital advertisements) to an A-coin exchange along with a payment indication for the content. The A-coin exchange may credit the advertisers with an advertiser-designated portion of A-coins associated with a brand. The A-coin exchange may send the digital advertisements to consumer devices (for example, to a smartphone). When the consumers watch the digital advertisements, their consumer devices may receive credit for spending time and money watching the digital advertisements. For example, the A-coin system may validate that a consumer watched ten full digital advertisements on their consumer device. Validation of the consumption of multimedia content may cause the A-coin exchange to transmit a digital currency (e.g., a consumer-designated portion of the A-coins) to the consumer device. The consumer designated portion of the A-coins may be linked to the advertiser-designated portion of the A-coin (described further below). The consumer device may accumulate further (consumer) A-coins for consuming further multimedia content. The consumer may use at least a portion of the accumulated A-coins to perform transactions (e.g., on-line and/or in a store) with those particular brands. In some examples, the consumer, via the consumer device may use the accumulated A-coins for outside of the brands (discussed further below). When the transaction is completed, the brand may receive the A-coin and the entire A-coin system may be considered to be at a zero sum state.

In some examples, the digital coin exchange environment of the present disclosure may create a framework to reward both subscribers (e.g., consumers) and advertisers. For example, advertisers spend money to manage brand equity as well as market products. It may be desirable to track investments made by advertisers. The digital coin exchange environment may provide such tracking through the creation, distribution and tracking of a-coins, thereby improving marketing efficiency. Similarly, advertisements may be a distraction (even if the application is free) to a subscriber. Thus, rewarding subscribers is both important and necessary for a system intended to improve loyalty and work done by the subscriber. By simultaneously rewarding advertisers and subscribers, in the same transaction, the framework of the present disclosure allows for a simultaneous improvement of marketing efficiency as well as rewarding consumer loyalty and efforts.

In one embodiment, the digital coin exchange environment including the A-coin system may represent a blockchain based digital advertising efficiency and loyalty solution. In some examples, the A-coin system may be implemented on a mobile edge computing platform. The example configuration may solve several problems, including for example, a low return on investment on advertisement campaigns, high costs and challenges for providing targeted advertising (which may lead to traffic to a brand or store). In some examples, A-coin may not be associated with a cryptocurrency or a crypto-market, even though it may be tradeable on an A-coin exchange of the present disclosure, in a manner similar to any digital coin. By enabling trading of A-coins on a digital coin exchange (i.e., the A-coin exchange), the A-coin system may improve marketing efficiency. In other words, all parties involved in a transaction may reap the benefits of what they paid for while simultaneously creating more transactions.

In one example embodiment, the digital coin exchange environment may provide a combination of immersive/video (or other multimedia content) advertising, a digital advertising market, a distributed ledger (e.g., blockchain) and loyalty points (e.g., through the A-coins) for products and/or services, such that a user may create an extremely valuable opportunity for various players in the advertising space. The digital coin exchange environment may combine all of these aspects to create a hyper local, low latency, high definition, trackable advertising exchange that simultaneously improves marketing efficiency and rewards loyal consumers for the cost of data usage (e.g., viewing digital advertisements) and their efforts.

Brands typically spend millions of dollars (if not billions) on digital advertisements, for example, to increase brand equity, increase revenue, increase brand awareness and increase users, subscribers and consumers. Given the rapid increase of mobile digital time, compared to desktop, the spending on multimedia may be driven by advertiser's investments in various mobile advertisement formats. The current state of digital advertising, and mobile formats in particular, is arguably inefficient and potentially overspent. An advertisement could be inefficient for several reasons. For example, users may have a preference of another brand for the same good, the brand may not be offered in the area and/or the user may not consume that good. While advertisers have improved their targeting of digital advertisements to users, to be more efficient with spending, it may be desirable to track and target users on a personal level.

One example of marketing inefficiency includes effective use of a digital advertisement for a particular brand, such as a commercial for the Papa John's° brand. Viewing the commercial could drive a consumer's urge for pizza several hours/days after watching the advertisement. However, because the consumer may prefer Domino's° or because there may not be Papa John's® retail outlet in close proximity to the consumer at that instance, the consumer may purchase a pizza at Domino's (e.g., the competitor's brand). From the perspective of the Papa John's° brand, this level of inefficiency is nearly impossible to solve with contemporary methods.

The digital coin exchange environment of the present invention creates, transfers and tracks loyalty points associated by brands (through the digital A-coins) in a novel manner, to create brand equity and drive users to consume the good/service more often. In effect, this may represent a customer retention strategy. In general, loyalty points may operate as follows: consume the good/service, gain X number of points. After Y amount of points are gained, consumers can use the points for a reward. Typically, this process is used to buy goods of the same brand. Credit cards have increasingly begun attempting to cross loyalty points during a credit card transaction (for example, buy good A and receive Z points to spend on good A, B or C). One popular example of this this type of loyalty program is in airfare. Consumers can buy points they have accumulated from their credit card or from previous flights to pay for their flights or hotel rooms. In some examples, the digital coin exchange environment may provide an improved loyalty program, where A-coins may be accumulated that are associated with Brand A, and which may be used for transactions for Brand A goods/services, as well as with any other good service (e.g., for Brand B). Current loyalty systems do not provide complete flexibility across brands and goods/services, in part because different stake holders may need to agree to cooperate for different brands which in turn may create layers of complexity and further marketing inefficiencies.

Turning now to FIG. 1, FIG. 1 is a functional block diagram illustrating example digital coin exchange environment 100 for transactions in a digital marketplace that may improve digital marketing efficiency and reward consumer loyalty, according to aspects of the present disclosure. In some examples, environment 100 may represent an electronic trading marketplace. Environment 100 may include A-coin platform 102, one or more advertiser servers 104, one or more media agency servers 106, at least one first mobile consumer device 108-1, at least one owner device 110 and at least one third party buyer device 112. In some examples, environment 100 may, optionally, include at least one second mobile consumer device 108-2. (First mobile consumer device(s) 108-1 and second mobile consumer device(s) 108-2 are collectively referred to herein as consumer device(s) 108.) Each of A-coin platform 102, advertiser server(s) 104, media agency server(s) 106, consumer device(s) 108, owner device 110 and third party buyer device 112 may comprise one or more computing devices, including a non-transitory memory storing computer-readable instructions executable by a processing device to perform the functions described herein.

In FIG. 1, second mobile consumer device 108-2 is similar to first mobile consumer device 108-1, except that first mobile consumer device 108-1 may be in direct communication with A-coin system 102, whereas second mobile consumer device 108-2 may be in direct communication with first mobile consumer device 108-1. Although the description herein describes environment 100 having at least two consumer devices 108-1 and 108-2, in some examples, environment 100 may include one or more consumer device 108-1.

A-coin platform 102 may be configured to create a type of record (i.e., A-coin) which may be traded (i.e., used to with electronic transactions) in a digital marketplace. More specifically, A-coin platform 102 may generate one or more A-coins, a type of digital coin that may not be tied to a cryptocurrency or a crypto-market but may be tradeable similar to typical digital tokens. In one embodiment, the generated A-coin(s) may be configured to operate in the digital realm.

A-coin platform 102 may be configured to generate A-coin(s) such that the digital coin may include two sides linked to each other through one or more identifiers and/or linking information. One side, Ai (also referred to as Ai coin), may be assigned to advertisers (e.g., publishers) and the other side, Ac (also referred to as Ac coin), may be assigned to consumers. A-coin may also be collectively referred to as Ai/c coin, when referring to both sides (i.e., Ai coin and Ac coin) of the same digital coin. Both the Ai and Ac portions of the Ai/c coin(s) may be generated in response to an advertisement (ad) request (from advertiser server(s) 104) for a particular brand. A-coin platform 102 may generate a first predefined number of Ai coins and a second predefined number of Ac coins in response to an advertisement request. In some examples, the first predefined number and the second predefined number may be the same. In other examples, the first predefined number and the second predefined number may be different. In general, the first and second predefined numbers of Ai and Ac coins may depend upon a number of factors, discussed further below. In any case, A-coin platform 102 may create, transfer, and track each of Ai coin and Ac coin, with respect to each other, and to a corresponding advertisement campaign associated with a corresponding brand through identifier(s) and/or linking information.

The Ai coin, for advertisers, may create an opportunity for A-coin platform 102 to track a consumer's behavior and to track the impact of a particular campaign. The Ac coin, for consumers, may allow A-coin platform 102 to provide a reward to the consumer (e.g., to mobile consumer device 108-1) after watching and/or interacting with a video (audio or any other type of digital multimedia) advertisement. For example, A-coin platform 102 may reward the consumer with Ac coin(s) for work performed, time spent, and/or a cost spent in downloading videos and/or other multimedia content. Moreover, A-coin platform 102 may be configured to implement blockchain technology for all transactions with A-coin platform 102.

A-coin platform 102 may be initiated (e.g., to create A-coin) by an advertiser launching a campaign in environment 100 for a product, service and/or their overall brand, through sending of an ad request from advertiser server(s) 104. Advertisers may pay A-coin platform 102, via a payment indication in ad request. A-coin platform 102 may create corresponding Ai/c coin and may transmit the Ai portion of the Ai/c coin to advertiser server(s) 104.

A-coin platform 102 may be configured to transmit an ad notification including digital multimedia content to at least one first mobile consumer device 108-1. In one non-limiting example, A-coin platform 102 may transmit a rich media notification with an embedded video to first mobile consumer device(s) 108-1. In some examples, when A-coin platform 102 verifies (e.g., through a confirmation from device 108-1) that a consumer of first mobile consumer device 108-1 watches at least one entire video (or consumes a predetermined number of multimedia content advertisements), A-coin platform 102 may transmit the Ac coin of the Ai/c coins to use at owner device 110 (e.g., which may represent one or more stores (permanent or mobile locations)) of the particular brand.

Figure 3:
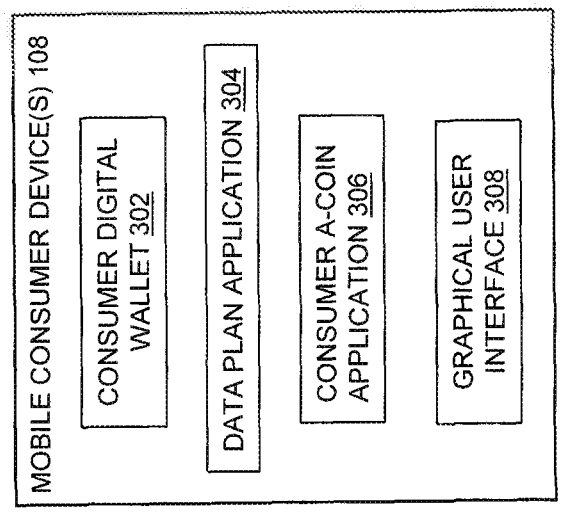
FIG. 3 is a functional block diagram of an example mobile consumer device according to an aspect of the present disclosure.

Moreover, in one embodiment, A-coin platform 102 may allocate and/or store the A-coins on a blockchain wallet of mobile consumer device 108-1 (e.g., consumer digital wallet 302 shown in FIG. 3). Once consumers use their Ac coin (via one or more transactions between first mobile consumer device 108-1 and one or more of owner device 110 and third-party buyer device 112), the brand, via A-coin platform 102, may track the efficiency of their campaign.

In general, a digital wallet represents an electronic device and/or an online service that may be used with one or more distributed ledgers, as well as mobile payment services, to perform electronic transactions. For example, a digital wallet may be used to purchase items on-line or to purchase items at a store (e.g., using a smartphone). The digital wallet may securely store, for example, a user's payment information and passwords for payment methods and websites. In some examples, a digital wallet may store public and private keys to receive or spend digital coins. The digital coin itself (e.g., Ac coin(s)) may be stored and maintained in a distributed ledger.

In some examples, consumer device 108-1 does not have to use the Ac coins exclusively at the specific brand (e.g., at owner device 110), but may also use the Ac coins at third party buyer device 112, according to a process discussed further below. When A-coin platform 102 determines that the Ac portion of the Ai/c coin has been used (e.g., in a transaction), A-coin platform 102 may retire both sides of the A-coin. In some examples, first mobile consumer device 108-1 may communicate with second mobile consumer device 108-2 and may transfer the Ac coins (provided by A-coin platform 102 to first mobile consumer device 108-1) to second mobile consumer device 108-2, such that second mobile consumer device 108-2 may perform one or more transactions with owner device 110 and/or third-party buyer device 112 with the transferred Ac coins. For example, first mobile consumer device 108-1 may transfer one or more Ac coins to second mobile consumer device 108-2 via respective consumer digital wallets (such as consumer digital wallet 302 shown in FIG. 3).

Advertiser server(s) 104 may be associated with one or more advertisers and may be configured to transmit one or more ad requests associated with one or more particular brands and, in some examples, one or more particular campaigns for particular brands. An ad request may include a payment indication and digital multimedia content (e.g., audio and/or video) associated with at least one advertisement for a particular brand/campaign. Advertiser server(s) 104 may also be configured to receive A-coins for particular brands (e.g., Ai coin) from A-coin platform 102. Advertiser server(s) 104 may include one or more computer devices including non-transitory memory storing computer-readable instructions executable by at least one processor. For the purposes of this disclosure, the term "brand" may refer to a specific brand and/or to a general store. Thus, with A-coin platform 102, a user may be able to apply A-coin for a particular brand at both a specific brand and at a general store. For example, a user may use their Ac coin(s) associated with Donut Brand X at Donut Brand X. When the user shops at a general store (such as Macy's), the user may only use their A coin(s) associated with Shoe Brand Y to buy Shoe Brand Y products. Another example relates to a user that has collected Ac coin(s) from a general store (e.g., Macy's). In this example, the user may use their Ac coin(s) associated with General Store Z at General Store Z to buy any brand because General Store Z is a brand along with a general store.

Media agency server(s) 106 may be configured to receive ad requests from advertiser server(s) 104, and associate ad requests with particular brands. In some examples, media agency server(s) 106 may be configured to aggregate multimedia content from a plurality of received ad requests for one or more campaigns. In some examples, media agency server(s) 106 may screen multimedia content in the received ad request and may validate that the content is for a particular brand/campaign. Media agency server(s) 106 may be configured to transmit ad requests to A-coin platform 102 for further processing. Advertiser server(s) 104 may include one or more computer devices including non-transitory memory storing computer-readable instructions executable by at least one processor.

In some examples, A-coin platform 102 and media agency server(s) 106 may be embodied on a single computing device. In other examples, A-coin platform 102 and media agency server(s) 106 may refer to two or more computing devices distributed over several physical locations, connected by one or more wired and/or wireless links.

Figure 9:
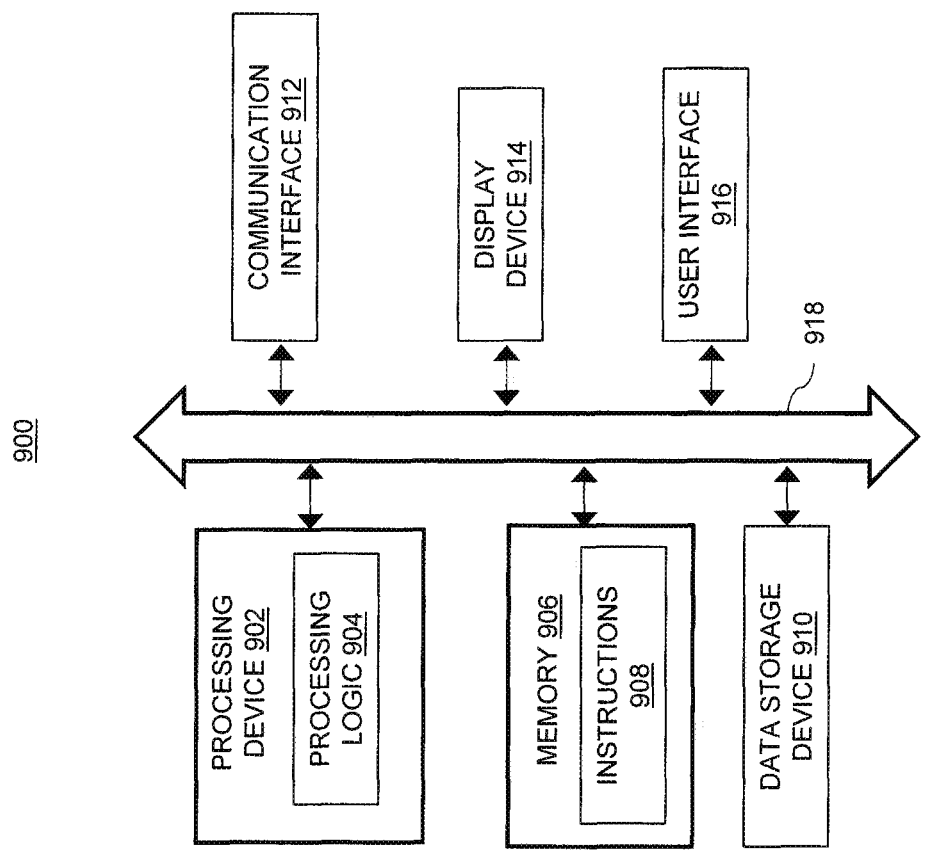
FIG. 9 is a functional block diagram of an example computer system, according to an aspect of the present disclosure.

A-coin platform 102 may comprise one or more processors configured to execute instructions stored in a non-transitory memory (such as shown in FIG. 9). A-coin platform 102 may be embodied on a single computing device, while in other embodiments, A-coin platform 102 may refer to a plurality of computing devices housed in one or more facilities. It should be understood that A-coin platform 102 refers to a computing system having sufficient processing and memory capabilities to perform the following specialized functions. In general, A-coin platform 102 may send and receive data from advertiser server(s) 104, media agency server(s) 106, mobile consumer device(s) 108, owner device(s) 110 and third-party buyer device(s) 112, data servers, or any other type of computing devices or entities over the internet, over a Wi-Fi connection, over a cellular network or via any other wired or wireless connection or network known in the art. A-coin platform 102 is described further below, according to FIG. 2.

A-coin platform 102, advertiser server(s) 104, media agency server(s) 106, consumer device(s) 108, owner device(s) 110 and third-party buyer device(s) 112 may be communicatively coupled via one or more networks. In some examples, advertiser server(s) 116 may be associated with one or more networks 116. In some examples, first mobile consumer device 108-1 may be associated with at least one network 118-1 and second mobile consumer device 108-2 may be associated with at least one network 118-2. In some examples, network(s) 118-1 and network(s) 118-2 may be the same network. In some examples, network(s) 118-1 and network(s) 118-2 may be different. The one or more networks (including network 116, network 118-1 and network 118-2) may include, for example, a private network (e.g., a local area network (LAN), a wide area network (WAN), intranet, etc.) and/or a public network (e.g., the internet).

One or more mobile network operators 114 may be configured to manage networks 118-1 and 118-2. In some examples, mobile network operator(s) 114 may be configured to manage a data plan of each of respective consumer device(s) 108. In some examples, as described in more detail further below, consumer device(s) 108 (e.g., first mobile consumer device 108-1) may consume multimedia content (e.g., a digital multimedia advertisement) responsive to receiving an advertisement (ad) notification from A-coin platform 102. In consuming the multimedia content, the mobile consumer device (e.g., device 108-1) may also consume an amount of data of a predetermined data plan associated with the respective device (e.g., device 108-1). In general, a data plan may be an agreement between mobile network operator 114 and a consumer of the consumer device (e.g., device 108-1) that specifies how much mobile data (e.g., access to the internet via network 118-1) the consumer may access for a specific fee. The mobile consumer device (e.g., device 108-1) may refill the associated data subscription service via communication with mobile network operator(s) 114. In some examples, A-coin platform 102 may be in communication with mobile network operator(s) 114 to transfer data subscriptions between consumer devices 108 (e.g., between mobile consumer device 108-1 and mobile consumer device 108-2).

Consumer device(s) 108 may comprise any electronic device associated with a data plan, such as, without being limited to a smartphone, a cellular telephone, a notebook computer, and any other suitable device. In some examples, consumer device(s) 108 may comprise a mobile device. In general, consumer device(s) 108 may include any computer device including a data access plan that may be viewed and credited for consuming digital multimedia ad content. A consumer may interact with consumer device(s) 108, for example, via a graphical user interface displayed on any type of display device including a smart-phone screen.

A functional block diagram of an example consumer device 108 (e.g., device 108-1 or device 108-2) is shown in FIG. 3. In general, consumer device 108 may include consumer digital wallet 302, data plan application 304, one or more additional applications including consumer A-coin application 306 and graphical user interface (GUI) 308. Consumer digital wallet 302 may be configured to communicate with platform digital wallet 212 (FIG. 2), for the transfer of Ac coin between A-coin platform 102 and consumer device 108. Data plan application 304 may be configured to provide access to a data plan associated with consumer device 108 and operated by mobile network operator(s) 114. The consumer may view and update the data plan via data plan application 304. Consumer A-coin application 306 may be configured to detect and notify the consumer, via GUI 308, of multimedia content advertisements, determine a consumption of one or more multimedia content advertisements, communicate with A-coin platform 102 to indicate any consumption of one or more of the advertisements, receive Ac coin from A-coin platform 102, interact with at least one of consumer digital wallet 302, A-coin platform 102 and another consumer device 108 (e.g., device 108-2) to transfer Ac coin and perform Ac coin-based transactions with owner device(s) 110 and/or third party buyer device(s) 112.

Referring back to FIG. 1, owner device 110 may include any suitable device, such as a point of sale (POS) device (e.g., embodied as a terminal including hardware and software and/or a software-based system on a mobile device for processing card payments at retail locations) for accepting payment of transactions from consumer device(s) 108. Owner device 110 may include any sort of mobile or non-mobile devices that include instances of a payment application that executes on the devices. In some examples, owner device 110 may correspond to a physical place of business (e.g., store). In some examples, the location of owner device 110 may change, e.g., if the owner is a food truck, sells at buyer's homes, etc.

Figure 4:
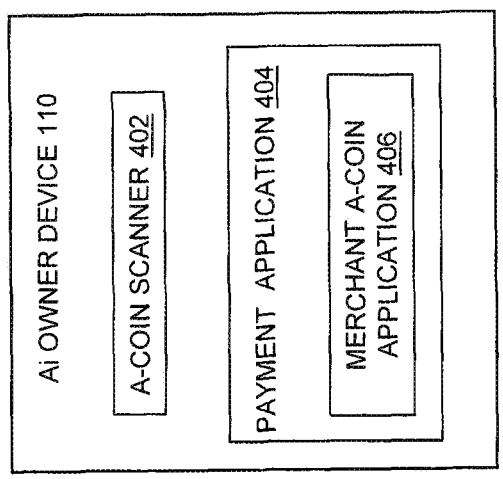
FIG. 4 is a functional block diagram of an example owner device of a particular A-coin according to an aspect of the present disclosure.

A functional block diagram of an example owner device 110 is shown in FIG. 4. Owner device 110 may include A-coin scanner 402 and payment application 404 including merchant A-coin application 406. A-coin scanner 402 may represent a payment scanner and/or reader that may be (modified) configured to detect, read and accept Ac coins provided by consumer device(s) 108. Payment application 404 may provide POS functionality to owner device 110 to enable a user (e.g., owners, employees, etc.) to accept payments from consumer device(s) 108. Merchant A-coin application 406 may be integrated within payment application 404 and may be configured to enable a user of owner device 110 to accept A-coins for incorporation into transactions (e.g., to at least partially or fully pay for a good and/or service), via A-coin scanner 402. A-coin application 406 may be configured, for example to accept Ac coins from consumer device(s) 108, validate Ac coins against Ai coins, buy Ai coins, complete transactions using Ac coins, and communicate with A-coin platform 102 (for example, to indicate completed transactions with Ac coin).

Referring back to FIG. 1, owner device 110 may be associated with a particular brand (e.g., Brand A) of a product and/or service. Owner device 110 may be configured to own (or be associated or accept) Ai coins that are specific to the particular brand (e.g., Ai coins for Brand A). In other words, owner device 110 may be configured to be associated with Brand A and permit A-coin transaction for Brand A. Owner device 110 may be configured to perform transactions for Brand A (products/services) with consumer device(s) 108 using corresponding Ac coins provided to consumer device(s) 108 by A-coin platform 102 that are linked to the Ai coins of owner device 110 and associated with Brand A. In some examples, owner device 110 may be configured to perform transactions for Brand A, Brand B, Brand C, Brand Z, etc. with consumer device(s) 108 using corresponding Ac coins provided to consumer device(s) 108 by A-coin platform 102 that are linked to the Ai coins of owner device 110 and associated with Brand A, Brand B, Brand C, Brand Z, etc.

Third-party buyer device 112 may be similar to owner device 110, in that third-party buyer device 112 may include any suitable device for accepting payment of transactions from consumer devices 110 and may be associated with a fixed and/or mobile location. Third party buyer device 112 may be different from owner device 110 in that third-party buyer device 112 may not be associated with the particular brand (e.g., Brand A) and may not be an owner of Ai coin (e.g., for Brand A). Third party buyer device 112, like owner device 110, may also be generally configured to accept A-coin for transactions (but may permit transactions for Brand B products/services). Third party buyer device 112 may also be configured to acquire Ai coin, associated with Brand A, from A-coin platform 102 (described further below).

Figure 5:
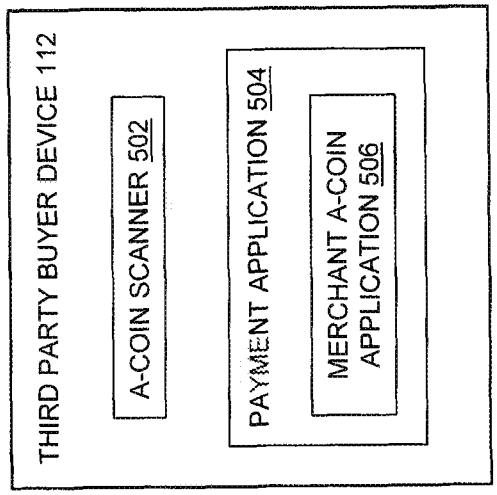
FIG. 5 is a functional block diagram of an example third party buyer device according to an aspect of the present disclosure.

A functional block diagram of an example third party buyer device 112 is shown in FIG. 5. Similar to owner device 110, third party buyer device 112 may include A-coin scanner 502 and payment application 504. A-coin scanner 502 is similar to A-coin scanner 402 discussed above. In third party buyer device 112, payment application 504 may include merchant A-coin application 506. Merchant A-coin application 506 may be integrated within payment application 504 and may be configured to enable a user of third party buyer device 112 to accept A-coins for incorporation into transactions (e.g., to at least partially or fully pay for a good and/or service), via A-coin scanner 502. A-coin application 506 is similar to A-coin application 406, except that A-coin application 506 may include further functionality to buy corresponding Ai coins (e.g., for Brand A).

Referring back to FIG. 1, in some embodiments, A-coin platform 102 represents a system to track digital advertising efficiency and a loyalty solution, through the exchange and tracking of Ai/c coins among consumer device(s) 108, owner device(s) 110, third party buyer device(s) 112 and advertiser server(s) 104, that may reduce consumer acquisition and retention costs while benefiting the consumer. The use of A-coin may provide benefits for both consumers and advertisers. For example, the consumer may allocate their loyalty points (through Ac coins) together for use anywhere (e.g., with both brand-specific owner device(s) 110 as well as third party buyer device(s) 112 (which may not be associated with and/or carry the same specific brand)). Advertisers, for example, may increase their campaign return on investment when consumers (through consumer device(s) 108) may use the allocated Ac coin (provided by A-coin platform 102) to buy products and/or services (via electronic transactions with owner device(s) 110 and/or third-party buyer device(s) 112).

In some examples, consumers may collect loyalty points, through (consumer) Ac coins, that are not brand or campaign specific from watching video advertisements (or consuming any other multimedia advertisements) sent to consumer device(s) 108 via A-coin platform 102. Marketers may receive (advertiser) Ai coins specific to the particular brand and the particular campaign. Consumer Ac coins nay be used at any brand (e.g., owner device 110) or any store that participates in the A-coin ecosystem (environment 100) (e.g., third party buyer device 112). In some examples, environment 100, may substantially prevent stores (e.g., third party buyer device(s) 112) and/or brands (e.g., owner device(s) 110) from becoming free riders (e.g., by benefitting from A-coin services without paying for the services), because stores and brands buy consumer Ac coin in A-coin platform 102 from the brand whose campaign the stores/brands received it from (i.e., via corresponding Ai coins of the Ai/c coin pair).

In some embodiments, A-coin platform 102 may provide a digital advertising efficiency and loyalty solution that is similar in some aspects to blockchain. In some embodiments, brands (e.g., owner device(s) 110) may be credited advertiser Ai coins for their multimedia content (e.g., video(s)) advertisement campaigns, and consumers may use consumer Ac coins (linked to the advertiser Ai coins), received from A-coin platform 102, for consuming multimedia content advertisements as a discount for transactions of products and/or services. The advertiser (brand) Ai coins are specific to a particular brand and respective campaign for the brand. In A-coin platform 102, consumer device(s) 108 may also use consumer Ac coins (for brand Ai), at third party buyer device 112 (e.g., a store that is not associated with and does not own brand Ai coin), when third party buyer device 112 agrees to buy the brand Ai coins through A-coin platform 102 (if third party buyer device 112 desires to accept the consumer). A-coin platform 102 may include a distributed ledger (e.g., blockchain), such as distributed ledger 210 shown in FIG. 2, and a digital wallet associated with A-platform 102 (such as platform digital wallet 212 shown in FIG. 2), to track Ai/c coin held by consumer device(s) 108, owner device(s) 110 and third party buyer devices 112, as discussed further below.

An example operation of A-coin platform 102 with respect to first mobile consumer device 108-1 and owner device 110 is described, with respect to FIG. 1. An operation may begin with advertiser server(s) 104 of products and/or services sending an ad request to media agency server(s) 106, where the ad request may include a payment indication and one or more multimedia content advertisements. Media agency server(s) 106 may perform validation and/or screening of the received ad requests and transmit the ad request to A-coin platform 102. Responsive to the ad request, A-coin platform 102 may create one or more Ai/c coins and may credit advertiser server(s) 104 with advertiser Ai coins of the Ai/c coins. A-coin platform 102 may also transmit an ad notification, including multimedia ad content to first mobile consumer device 108-1. In some examples, advertiser server(s) 104 may then transfer one or more Ai coin(s) to owner device(s) 110. In some examples, A-coin platform 102 may also transmit one or more Ai coin(s) to owner device(s) 110.

Following the ad notification, advertisements may be consumed (e.g., viewed) by a consumer of first mobile consumer device 108-1. In some examples, to receive maximum rewards, it may be desirable for the transmitted multimedia advertisements to be consumed in full (e.g., an entire video watched in full) and the consumer may, optionally, answer at least question at the end of consumption of the multimedia content (e.g., to prevent against bots attempting to collect consumer Ac coin) while using the consumer's data plan to consume the advertisement. When A-coin platform 102 verifies that the consumer has fully consumed the multimedia content, A-coin platform 102 may transmit one or more consumer Ac coins to first mobile consumer device 108-1.

Consumer Ac coins may be spent, for example, on goods and/or services through one or more transactions between first mobile consumer device 108-1 and owner device 110. (In some examples, the number of digital advertisements sent to first mobile consumer device 108-1 per day may be fixed to a predetermined number.) For example, the number of Ac coins issued per day may depend on how many digital advertisements are submitted by advertiser server(s) 104 and/or how many digital advertisements are consumed by consumer device(s) 108. First mobile consumer device 108-1 may accumulate enough consumer Ac coins to purchase items and/or services through repeated viewing of digital advertisements. In one embodiment, a consumer's digital A-coin wallet (e.g., consumer digital wallet 302 shown in FIG. 3) may be validated and credited using blockchain technology to ensure how many Ac coins consumer device 108-1 includes at any given time. Because the first consumer device 108-1 is using its own data plan to consume the multimedia content (e.g., watch a video), and spends time and effort watching, clicking, etc. on an ad, the consumer "owns" the Ac coins.

As part of the transaction, owner device 110 may match the received Ac coins with the advertiser Ai coins, to confirm that the Ac coins are indeed linked (e.g., associated with) the Ai coins. In some examples, A-coin-platform 102 may verify the match internally, along with owner device 110. When the match is validated by owner device 110, the consumer of first mobile consumer device 108-1 may receive the good and/or service from owner device 110. In some examples, if owner device 110 does not have any Ai coins, owner device 110 may communicate with A-coin platform 102 and buy the Ai coins from A-coin platform 102, to validate consumer Ac coins from first mobile consumer device 108-1. In some examples, buying and selling of Ac and Ai coins may be performed with extremely low latency and a hyper local distribution. In any event, once the exchange is completed by first consumer device 108-1 with owner device 110, A-coin platform 102 may transmit a predetermined percentage of the A-coins (i.e., Ai coins) to one or more media agency server(s) 106 for their role in environment 100 based off of digital marketing performance and other key performance indicators (KPI's). Thus, media agency server(s) 106 may receive a percentage of Ai coins, and may sell the rewarded Ai coins in the electronic market.

An example operation of A-coin platform 102 with respect to first mobile consumer device 108-1 and second mobile consumer device 108-2 is next described, with respect to FIG. 1. First mobile consumer device 108-1 may be configured to transfer consumer Ac coins (accumulated by first mobile consumer device 108-1) to second mobile consumer device 108-2 according to at least one of (without being limited to) the data and/or effort that it took to gain the amount of consumer Ac coins that first mobile consumer device 108-1 wants to transfer or that second mobile consumer device 108-2 requests to be transferred. Second mobile consumer device 108-2 may then perform transactions with owner device 110 (e.g., a brand) using the transferred Ac coins, as discussed above (or with third party buyer device 112 as discussed below).

Accordingly, similar to a trade, Ac coins may be transferred from one user to another. Thus, first device 108-1 of User X may receive Ac coin(s) for their work in consuming multimedia advertisement content with their data subscription. User Y of second device 108-2 may desire to use the Ac coins of User X. However, the transfer of Ac coins may not be performed for free. For example, second device 108-2 may send first device 108-1 data for User X's own work in consuming content. A-coin platform 102 enables this transfer to occur. User X sends User Y the Ac coins (via first and second consumer devices 108-1, 108-2) and in return, User Y sends User X the amount of data that User X used to watch the advertisement video (shown in FIG. 1). A conversion formula for converting A-coins transferred to data usage updates may be potentially dynamic and may depend upon a number of factors (e.g., a time of A-coins received by first device 108-1, a cost of data payable by User Y of second device 108-2, etc.).

An example operation of A-coin platform 102 with respect to first mobile consumer device 108-1 and third-party buyer device 112 is next described, with respect to the dashed lines shown in FIG. 1. If first mobile consumer device 108-1 attempts to perform a transaction, with Ac coin, at third party buyer device 112 (e.g., for Brand B) who does not market with Ai coin (e.g., for Brand A), first mobile consumer device 108-1 may still be able to use the Ac coin for the transaction. To do so, third party buyer device 112 may communicate with A-coin platform 102, and request to purchase the matching Ai coins (for Brand A) from owner device 110. A-coin platform 102 may communicate with owner device 110 and receive a confirmation that owner device 110 agrees to sell at least a portion of Ai coin to third party buyer device 112. Responsive to the confirmation, A-coin platform 102 may permit third party buyer device 112 to acquire Ai coin for completing the transaction with first mobile consumer device 108-1. The ability of A-coin platform 102 to permit transactions with third party buyer device(s)) 112 that do not market with Ai coin, by the described acquiring process, provides more opportunities for a consumer to use the accumulated consumer Ac coin, and creates a higher efficiency for brands/stores of their marketing dollars and for consumers receiving a discounted product and/or service.

In some examples, owner device 110 may include a retail store. Retail stores typically sell several different brands of goods and/or services (e.g., several brands of clothing). Not every brand of the retail store may be associated with an A-coin multimedia advertisement campaign. In addition, the retail store may not know whether a consumer requests to pay for a transaction with A-coins. However, it may be desirable for the retail store to accept A-coins and participate with A-coin platform 102. Two interactions may occur with retail stores and A-coin: the retail store may be compensated by the brand for accepting A-coin transactions, and the A-coin may have access to A-coin platform 102 (to verify an existence of Ai coins for the brand being purchased). In other words, a brand may provide monetary and/or A-coin compensation for accepting A-coins. It may be desirable for the retail store to be compensated because, otherwise, the retail store may be selling discounted goods of brands while losing out on benefits associated with participation with A-coin platform 102 and advertisers. The retail store may be compensated in several different ways from brands (e.g., a lump sum monetary compensation, a percentage of the gained profit through revenue share or Ai coins in general). It is also desirable for the retail store to have access to A-coin platform 102 in order to validate whether a brand includes Ai coins. For example, the retail store may send an inquiry to A-coin platform 102 for a brand, and A-coin platform 102 may respond with a may respond with a yes/no reply.

In one embodiment, digital coin exchange environment 100 may also include A-coin mining. Mining of A-coins is far different from any other blockchain/cryptocurrency mining. As described above, to gain Ac coins, a user consumes multimedia advertisement content on mobile consumer device 108-1 via a paid-for campaign by an advertiser in A-coin platform 102 (via A-exchange 208, shown in FIG. 2). It may appear as if a user can consume an unlimited number of videos (or other multimedia content) to accumulate an unlimited amount of Ac coins, but this is inaccurate. The mining of Ac coins may come directly from the user using their data subscription to consume the video. In principle, the user may drain the user's "data bucket" every time the user consumes multimedia content. Creating a correspondence between data usage and number of A-coins may vary from simple to complex, with the understanding that a simpler system may be easier to implement.

To refill the "data bucket", the user may pay mobile network operator(s) 114. The user may choose how they want to use their data, but Ac coins may be gained by using the user's data subscription. This data subscription usage is also what separates A-coins from cryptocurrencies. A-coins may not be directly tied to a bank or may not require users to purchase A-coins via an exchange. Instead, A-coins (e.g., Ac coins) may represent a reward for consuming multimedia ad content (e.g., watching a video) and the amount of data in the user's subscription may lowered correspondingly. If the user would like to refill their data subscription, the user can refill their subscription via communication with mobile network operator(s) 114. It is important to observe, that such transactions are prone to digital fraud—for example, a "bot" may start watching advertisements passively especially when the subscriber has signed up to "unlimited" data plans. Hence, any implementation of such "mining" transactions should be recorded in digital ledgers (e.g., blockchain) that eliminate such fraud. In another embodiment, by working in conjunction with mobile network operator policy management functions such fraud can be detected and throttled effectively.

In some examples, A-coin platform 102 may be configured as part of a type of Mobile Edge Computing (MEC) platform. In some examples, in general, a-coin platform 102 may be configured as part of an edge Internet architecture and may include a MEC platform for connectivity. In general, MEC comprises a network architecture that enables cloud computing and an information technology (IT) service environment at the edge of any network including the radio edge of cellular networks. In some examples, A-coin platform 102 may leverage advantages of a suitable MEC platform for providing traffic efficiency of advertisement multimedia content even at a local campaign level. In some examples, the combination of a distributed ledger for A-coin exchange and an MEC platform architecture may enable A-coin platform 102 to provide transparent, fraud proof, low latency transactions between the A-platform 102, consumer device(s) 108, owner device(s) 110 (e.g., brands) and third-party buyer device(s) 112 (e.g., stores).

In one embodiment, A-platform 102, powered by an MEC platform, may support low latency transfers, may record and enable hyper local exchanges, and may enable buying and selling of A-coins. As discussed above, advertiser server(s) 104 may receive Ai coins (one component of an A-coin) when they pay A-coin platform 102 for their campaigns. A-coin platform 102 may transmit Ac coins (the other component of an A-coin) to consumer device(s) 108 (e.g., device 108-1) when consumers consume multimedia content advertisement(s). When consumers pay owner device(s) 110 and/or third party buyer device(s) 112 with the Ac coins, the customer Ac coin is not specific to brands and/or stores. However, the advertiser Ai coins are brand specific.

A-coin platform 102 may perform an integral technique that may allow consumers to pay for goods and/or services with accumulated consumer Ac coins, including when the Ac coins are not all gained from the specific brand they wish to buy goods and/or services from. A-coin platform 102 permits the brand where the consumer is paying (e.g., third party buyer device 112) to communicate with A-coin platform 102, in order to "buy the rights" to the corresponding Ai coins that the consumer is paying with, through the Ac coins (this may be from multiple other brands). For the buying and selling of Ai coin, this is where powering of A-coin platform 102 by an MEC platform to support low latency transfers and buying and selling may be critical.

In another embodiment, A-coins accumulated by either consumers (via consumer device(s) 108) or advertisers (via advertiser server(s) 104) may be limited to a particular regional area of advertising, and hence redemption and selling of A-coins in another region may involve an "exchange ratio." For example, a consumer watching an advertisement from a pizza retailer in North New Jersey (e.g., Bergen County) may pay a premium exchange ratio to redeem points at a shoe outlet in a southern part (e.g., Cape May County) of the same state. The same exchange rate consideration may apply to different advertisers as well. Moreover, it is desirable for any such transaction to execute seamlessly without any or substantially minimal delay in addition to recording the location of all transactions.

As can be seen in the stock market, for example, different companies' stocks may be worth more than other companies' stocks. The same principle may apply to different A-coin brands. For example, Brand X's Ai/c coins may be assigned a worth (i.e., a value) that may be double a worth of Brand Y's Ai/c coins. The value of a brand's Ai/c coins may depend on what the brand is willing to pay into A-coin platform 102 (e.g., via media agency server(s) 106). In an example embodiment, the value of Ai/c coin may not be dependent on a brand's stock price(s). The value of Ai/c coin may also depend on other factors.

For example, if the brand provides media agency server(s) 106 longer duration advertisements, the advertisements may be worth more Ai/c coins than shorter duration advertisements. As another example, if the advertisement is transmitted in a higher quality, the advertisement may be worth more Ai/c coins than advertisements of worse quality. For the purposes of this disclosure, quality may refer to video resolution (e.g., 480p, 720p, 1080, etc.) and/or advertisement format. Linking a value of Ai/c coin to advertisement quality may encourage media agencies and advertisers to deliver higher "quality" advertisements such as Augmented Reality ads, Virtual Reality ads, 360-degree ads, hyper local ads (e.g., ads that may be relevant to the user's specific geographical area) and/or targeted ads (e.g., ads that may be specific to the user based on their profile). Higher quality ads may be more likely to engage with a user who watches the advertisement than a standard video or banner advertisement. It is understood that the examples described herein are non-limiting examples, and that other examples are possible. To expand on quality, if the advertisement is transmitted in a more appealing format, such as AR/VR/360 degrees, those advertisements may be worth more Ai/c coins than those of normal video advertisements. As another example, if the Ac coins of Brand X are spent at Brand Y of the same good (where Brand Y is not on an exchange of A-coin platform 102 but desires to buy the corresponding Ai coins), the Ai/c coins could be worth half as much as for Brand X. Consequently, instead of punishing those third party buyer device(s) 112 not holding the Brand Ai coin but are willing to buy the Ai coins from the original brand, if the Ac coins are used at the store of the brand they were sent from, the Ai/c coins could be worth double their value. In general, a value of A-coins may be highly flexible and may be determined according to one or more variables that may be determined by rules that may change dynamically with time (e.g., based on supply and demand).

In some examples, a number of Ac coins provided to first mobile consumer device 108-1 per multimedia content advertisement may be determined by the end user. For example, by the work performed by the end user, via consumption of the multimedia content on first mobile consumer device 108-1 and payment for data downloads. In some examples, consumer Ac coins that are provided per advertisement may be directly correlated to the price of the data in that country, region, town, etc. of mobile network operator 114 at that particular time. Thus, in some examples, A-coins may be given a different value based on the location of mobile consumer device(s) 108 (e.g., first mobile consumer device 108-1). In some examples, a value of A-coins in the United States may be set higher than a value of A-coins in another country (e.g., India) because the cost of 1 GB of data may be higher in the United States. For instance, a user in the United States may use more of their data resources to watch the a video advertisement than a user in India, and therefore may be rewarded in turn. In another example, if a user receives the Ac coin while mobile consumer device 108-1 is located in India and uses the Ac coin while mobile device 108-1 is in California, the Ac coin may be worth considerably less and therefore may purchase considerably less. The use of location and data resources to value A-coin may thus protect against manipulation of A-coin platform 102. More generally, in some examples, A-coins in one region (e.g., Northern New Jersey) may be set to differ in value compared to another region (e.g., Southern New Jersey). The flexibility or valuing A-coins may allow for a broader transaction framework, and may also optimize efficiencies in a hyperlocal manner.

As discussed above, media agencies (via media agency server(s) 106) may receive A-coins as a reward for A-coin platform 102 delivering the advertisements to the user. A brand's $100,000 campaign may include costs to the marketers and advertisement agencies, with each receiving a small portion of the campaign budget for their role. Their portion is often tied to performance. Media Agencies may receive a small portion of the campaign budget in A-coins, with the amount being tied to performance. The amount may be variable dependent on how media agencies have performed. These variables may include, without being limited to, at least one of advertisements sent, clicks, impressions, whether the advertisement was sent hyper locally, performance of the multimedia (e.g., latency, buffering, etc.). The variability of the amount may incentivize media agencies and A-coin platform 102 to operate at greater efficiency. In turn, media agencies, via media agency server(s) 106) may enter A-coin platform 102 with its rewarded A-coins and sell the A-coins to third parties who may desire to sell their A-coins. In some examples, media agencies may receive no preferential treatment with lower costs in A-coin platform 102 because the media agencies have set up the exchange of A-coins in A-coin platform 102.

In general, A-coin platform 102 may provide advantages, including increasing digital marketing efficiency of digital multimedia content advertisements, increasing brand loyalty, increasing brand equity, drive conversions, lowering churn, increasing a lifetime value of the customer and rewarding customers for work done to consume digital multimedia content and loyalty.

Figure 2:
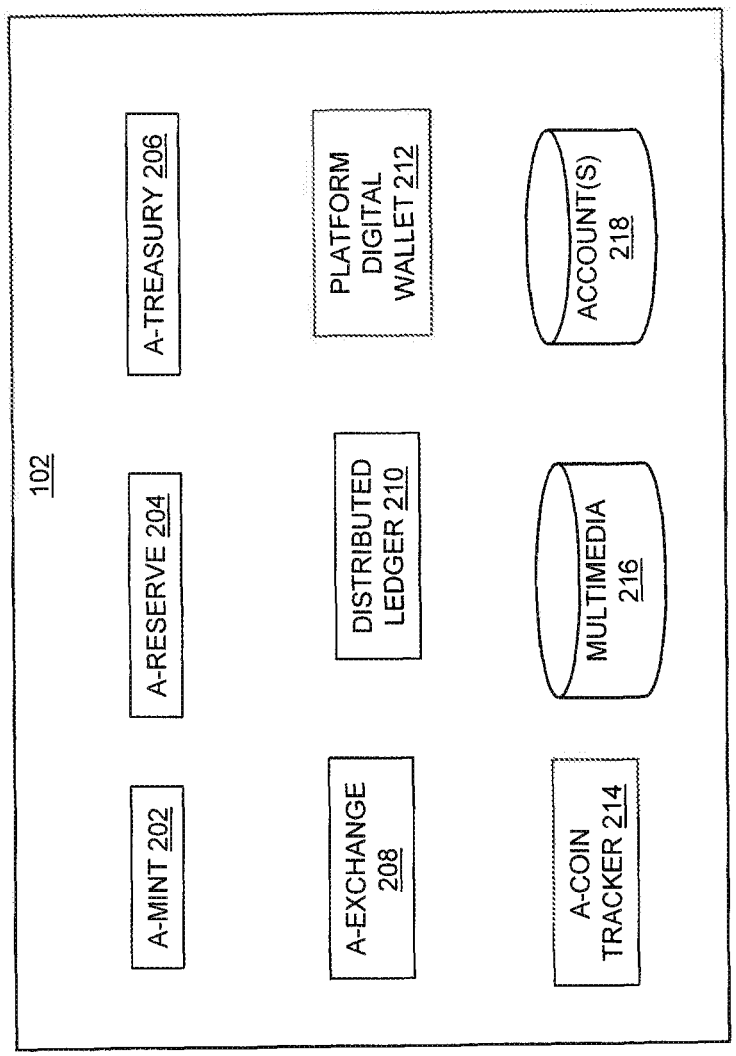
FIG. 2 is a functional block diagram of an example A-coin platform according to an aspect of the present disclosure.

FIG. 2 is a functional block diagram of example A-coin platform 102, according to an aspect of the present disclosure. A-coin platform 102 may include A-mint 202, A-reserve 204, A-treasury 206, A-exchange 208, distributed ledger 210, platform digital wallet 212, A-coin tracker 214, storage 216 storing multimedia ad content and storage 218 storing information relating to one or more accounts.

A-mint 202 may comprise an entity similar to a regulatory mint, and may be configured to digitally print (i.e., create) A-coins (i.e., Ai/c coins). A-Mint 202 may print one or more individualized Ai coins for each advertiser, may print one or more and creating the linked individualized corresponding Ac coin for consumer device(s) 108 and may create identifier(s) and/or linking information to link the Ai coin(s) with the Ac coin(s). The Ai/c coins may generated such that the Ai/c coins are individualized to the specific campaign for the advertiser with identification on each coin. The consumer Ac coin may correspond to the advertiser's Ai coin for matching during transactions. Consumer digital wallet 302 (FIG. 3) may show the accumulation of the consumer's Ac coins with the specific identifiable Ai coins also listed.

A-reserve 204 may be configured to store A-coins. A-reserve 204 may hold A-coins once the A-coins have reached their full maturity (e.g., a life span of Ai/c coins). A-reserve 204 may track all transactions, and may, thus, be able to determine a market value of the A-coins from the tracked transactions. A-reserve 204 may also keep track of what campaigns are still running and what campaigns are completed. The A-coins may be matched at the end of their cycle with each of the corresponding sides (i.e., Ai and Ac) and kept to never be used again (e.g., retired). In general, an end of cycle may refer to how Ai/c/coins may be collected at the end of an advertisement campaign, when they are used. In general, retirement of A-coin may mean that the A-coin with any tracking information may be eliminated from usage, and never used again. For example, the A-coin specific to a particular advertising campaign will no longer be available.

In general, A-reserve 204 may hold A-coins. In some examples, A-reserve 204 may include a secure data storage. A-reserve 204 may include a record of transactions that have occurred, where the user collected A-coins (e.g., A-coins may have different values in different geographic locations), how much each A-coin is worth (e.g., dependent, for example, on at least one of a video size, video type, hyper locality, video quality, video length, where the Ac coin is used, etc.). A-reserve 204 may also hold a record of what advertising campaigns are ongoing with the related A-coins and what advertising campaigns have ended with the related a-coins. When an advertising campaign has ended, and all a-coins have been used and collected, A-reserve 204 may hold them such that the A-coins are never used again (i.e., retired).

In addition to maintaining the life cycle of A-coins, A-reserve 204 may also oversee a total amount of A-coins in the digital market to maintain stable prices; regulate advertisers, users and agencies to maintain the integrity of A-coin platform 102; ensure the stability of A-coin platform 102 and the risk that may arise in the digital market; and provide transparent operating practices in a payment system of A-exchange 208. In general, maintaining stable prices and providing transparent operating practices may refer to management of A-coin platform 102 to ensure there is no fraudulent activity and that consumers are properly credited with Ac coins.

To coincide with A-mint 202 and the printing of A-coins, A-treasury 206 may be configured to manage the A-coins. A-treasury 206 may be configured to, without being limited to, validate consumption of A-coin; collect and make all payments in A-exchange 208; manage currency inside of A-exchange 208; manage accounts in storage 218, advise transactions between brands and advertisers; enforce the code of A-coin platform 102; investigate any fraudulent transactions or activity; and publish one or more statistical reports (e.g., through collection of data/information). In some examples, A-treasury 206 may be configured to, without being limited to, communicate with A-exchange 208 regarding payment allocation and any disputes, manage fluctuation of A-coin in accounts (e.g., stored in storage 218) (for example, when users may have gained A-coins where the values may be different), provide templates for transactions, and ensure that the rules of A-coin platform 102 are not broken (which may be defined by one or more parties (in some examples, by all parties) participating in environment 100).

A-exchange 208 may be configured to perform transactions between brands and advertisers. In some examples, A-exchange may perform transactions between consumer device(s) 108 and owner device(s) 110, between consumer device(s) 108 and third party buyer device(s) 112, between third party buyer device(s) 112 and owner device(s) 110, as well as transactions with advertiser server(s) 104 and media agency server(s) 106. In some examples, A-exchange 208 may be configured to buy and sell Ac/Ai coins on an open market. In some examples, A-exchange 208 may communicate with mobile consumer device 108-1 (e.g., via consumer A-coin application 306 (FIG. 3) to transmit ad notifications, receive confirmation of multimedia consumption and transfer of Ac coin(s) from A-coin platform 102 to mobile consumer device 108-1. In some examples, A-exchange 208 may operate with distributed ledger 210 to record and manage transactions with A-coin platform 102, as well as record any creation, transfer and retirement of Ac and Ai coins. In some examples, A-exchange 208 may transfer Ac coin to mobile communication device 108-1 via transfer between platform digital wallet 212 (associated with A-platform 102) and consumer digital wallet 302 (of mobile consumer device 108-1). In some examples, platform digital wallet 212 and consumer digital wallet 302 may be synced together and validated through the (e.g., blockchain) distributed ledger 210. In some examples, platform digital wallet 212 and consumer digital wallet 302 may be configured to transfer and store data and A-coins but may not be configured for integration with third party cryptocurrency (e.g., bitcoin) wallets.

In some embodiments, distributed ledger 210 may include a blockchain or a hyper-distributed ledger, and may represent the backbone of A-coin platform 102. The advantages of using blockchain or other distributed ledger technology may allow for: greater efficiency, reliable and high-quality data, lower transaction costs, data security, trust and transparency and independent collection of information. In A-coin platform 102, in some embodiments, all transactions, interactions, payments, records, printing of A-coins, maintenance of A-coins, life cycle of A-coins, digital wallet 212, transfers, etc. by A-exchange 208, A-mint 202, A-reserve 204, A-treasury 206, advertising server(s) 104, and brands (e.g., owner device(s) 110), third party buyer device(s) 112 may be recorded in distributed ledger 210. More generally, A-coin platform 102 may leverage distributed ledger 210 as a transaction and record keeping book. All transactions, for example, transactions between advertisers and A-coin platform 102, transactions with consumers, transactions between consumers, transactions between users and brands, and transactions between brands and third parties may be kept on distributed ledger 210.

Platform digital wallet 212 may be validated and credited using distributed ledger (e.g., blockchain) technology. For example, different "blocks" in distributed ledger 210 are substantially impossible to edit once they have been entered into distributed ledger 210. In addition, the blockchain may ensure credibility and validity by using several different sources for the "block." If one "block" of the chain is different than the other "blocks." This difference may represent an indication of fraudulent activity.

A-coin tracker 214 may be configured to track Ai/c coins through digital coin exchange environment 100. In some examples, A-coin tracker 214 may be part of A-reserve 204. Tracking of A-coins may be used by the advertisers and by A-platform 102 at the consumer level to track the efficiency and power of the digital advertisements by deriving various metrics. By individually tracking the Ai/c coins, advertisers and A-coin platform 102 may be able to understand much more about the consumer. The tracking may consider one or more variables, such as, without being limited to, timing usage, advertisement power, brand loyalty and location tracking. For example, tracker 214 may determine what time may be best to send a digital advertisement to the consumer to drive a conversion to Ac coin. As another example, tracker 214 may determine how long it took for the consumer use the Ac coins. As another example, tracker 214 may determine where the Ai/c coins are used. Other examples for tracking Ai/c coins may include advertisement power, such as an efficiency of the digital advertisements to drive conversions; brand loyalty, such as how loyal consumers may be to that brand over other brands after consuming a digital advertisement; and location tracking, such as tracking where the user is located and how the location may correlate to how the user responds to the digital advertisement. In one example, tracker 214 may be implemented by putting tags onto the individual Ai/c coins to understand their history. A number of efficiency metrics may then be derived from such a tracking framework in a transparent manner.

Storage 216 may store multimedia content for one or more digital advertisements received from advertiser server(s) 104 (e.g., via media agency server(s) 106. Storage 218 may store information for one or more accounts associated with digital coin exchange environment. Accounts may include account information for advertiser(s) of advertiser server(s) 104, media agency(s) of media agency server(s) 106, consumer(s) of consumer device(s) 108, owner device(s) 110, third party buyer device(s) 112. The account information may include, without being limited to, a personal identifiable username, a mobile phone number, an email address, a secondary email address, and/or a verifiable pin that is unique to the user (and not available to been seen by the public). In some examples, the username may not be the user's full (e.g., actual) name. In some examples, the username may be the user's actual name. Storage 216 and storage 218 may include any suitable non-transitory storage medium.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in specialized software, firmware, specially-configured hardware or any combinations thereof.

Figure 6:
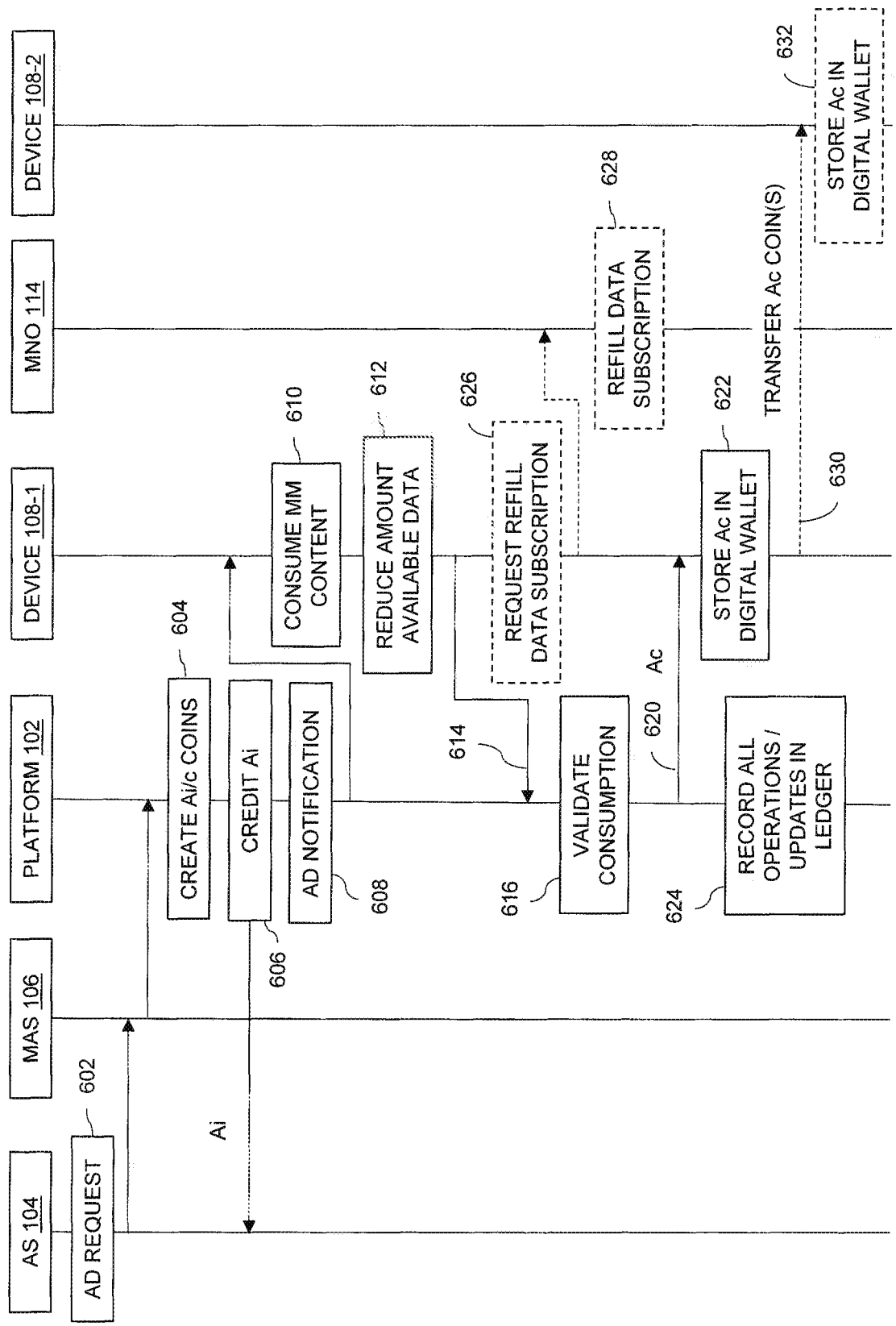
FIG. 6 is a signal flow diagram of an example method of creating A-coins and transmitting A-coin portions to a mobile consumer device and an advertiser server responsive to an advertisement (ad) request associated with the digital coin exchange environment shown in FIG. 1, according to an aspect of the present disclosure.
Figure 7:
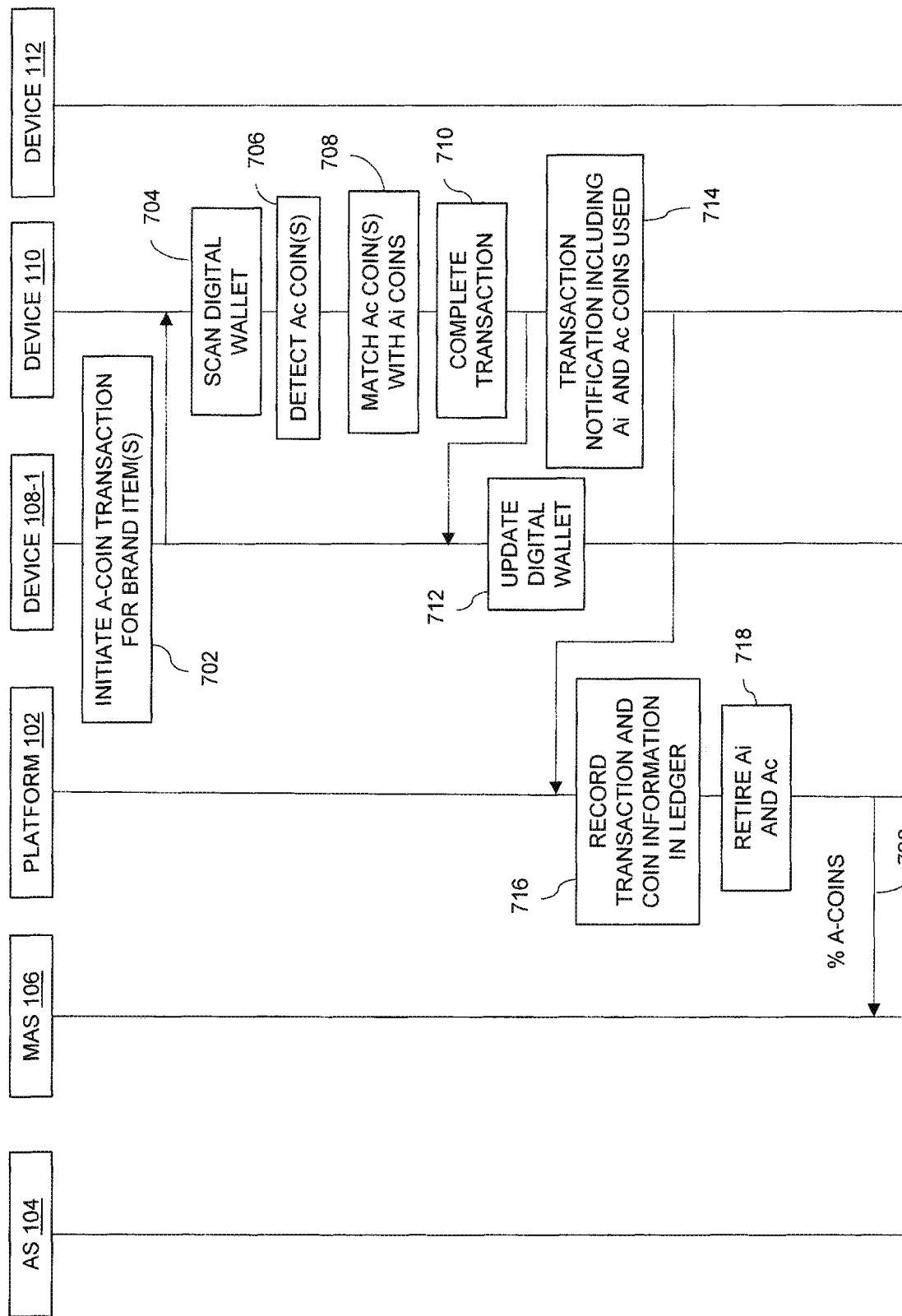
FIG. 7 is a signal flow diagram of an example method of performing an A-coin transaction between a mobile consumer device and an owner device of the corresponding A-coin of the transaction associated with the digital coin exchange environment shown in FIG. 1, according to an aspect of the present disclosure.
Figure 8:
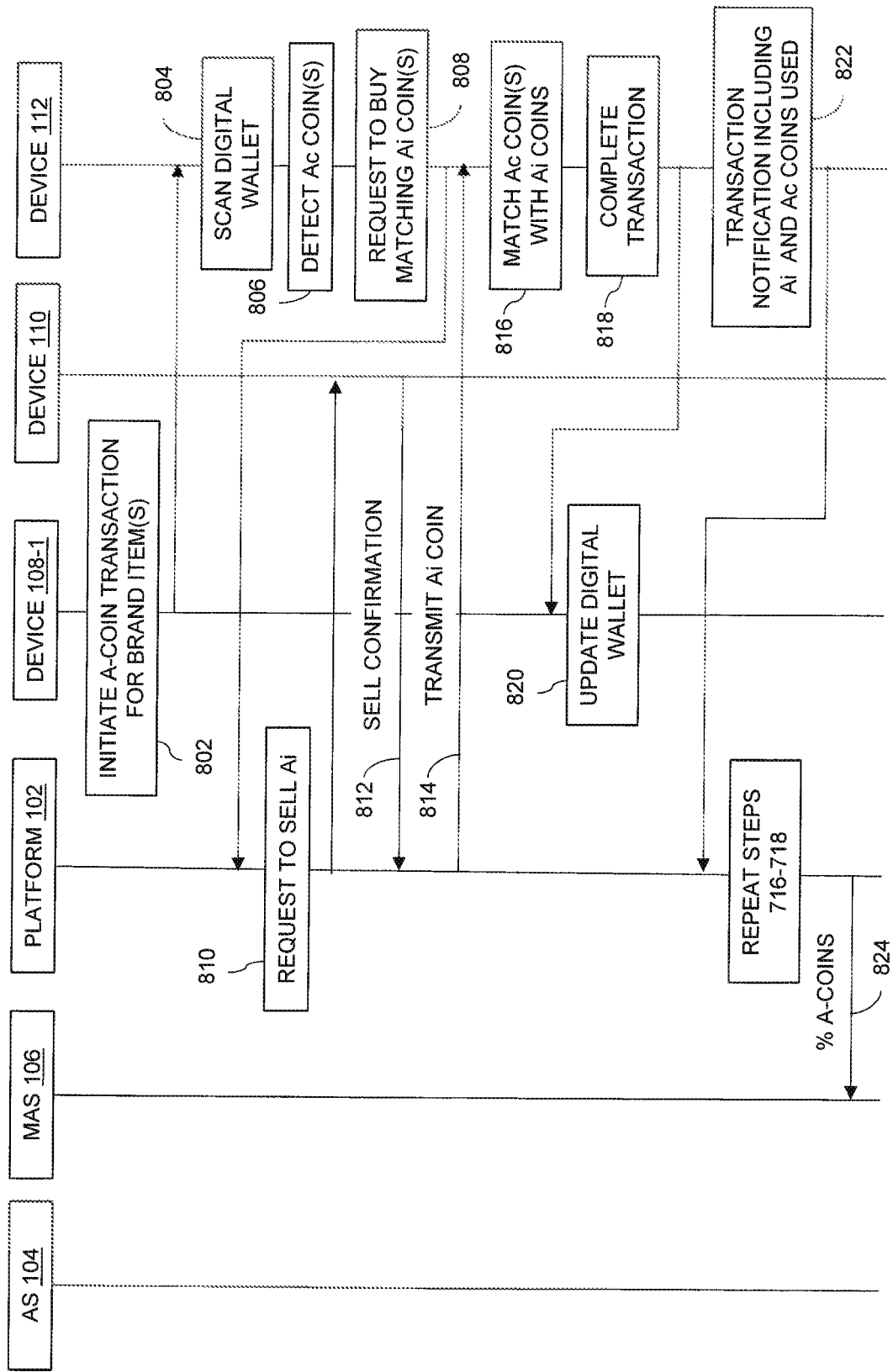
FIG. 8 is a signal flow diagram of an example method of performing an A-coin transaction between a mobile consumer device and a third party buyer device, not associated with the corresponding A-coin of the transaction, associated with the digital coin exchange environment shown in FIG. 1, according to another aspect of the present disclosure.

Those skilled in the art will appreciate that A-coin platform 102 may be configured with more or less modules to conduct the methods described herein with reference to FIGS. 6-8. As illustrated in FIGS. 6-8, the methods shown may be performed by processing logic that may comprise hardware (e.g., circuitry, dedicated logic, programmable logic, microcode, etc.), software (such as instructions run on a processing device), or a combination thereof. In one embodiment, the methods shown in FIGS. 6-8 may be performed by one or more specialized processing components associated with components 202-218 of A-coin platform 102 of FIG. 2. FIGS. 6-8 are described with respect to FIGS. 1-5.

FIG. 6 illustrates a signal flow diagram of an example method of creating A-coins and transmitting Ac and Ai coin portions to respective first mobile consumer device 108-1 and advertiser server(s) 104 responsive to an ad request associated with digital coin exchange environment 100 shown in FIG. 1, according to an aspect of the present disclosure. At step 602, advertiser server(s) (AS) 104 may transmit an ad request to media agency server(s) (MAS) 106. MAS 106 may forward the ad request to A-coin platform 102 (also referred to herein as platform 102), for example, to A-treasury 206 of platform 102. In some examples, the ad request may include one or more digital advertisements including multimedia content associated with a brand and/or a campaign for a brand. The ad request may also include a payment indication associated with the digital advertisement. In some examples, platform 102 may store the digital advertisements in storage 216.

At step 604, A-mint 202 of platform 102 may create one or more Ai/c coins, including one or more Ai coins associated with the advertiser (of the ad request) and one or more Ac coins associated with consumers. A-mint 202 may create the Ai/c coins such that the Ai coins are linked to the Ac coins by one or more identifiers and/or other linking information. In some examples, A-treasury 206 may be configured to extract the payment indication in the ad request and, responsive to verifying the payment indication, cause A-mint 202 to initiate creation (printing) of Ai/c coin. At step 606, A-mint 202 may credit at least one advertiser associated with advertiser server(s) 104 with Ai coins. The term "credited" in this context, may refer to the exchange of money, validation of payment and issuing of Ai coins to the advertiser(s). In some examples, advertiser server(s) 104 may transfer Ai coin(s) to owner device 110 responsive to the credited Ai coins(s) (at step 606). In some examples, A-coin platform 102 may transmit Ai coin(s) to owner device 110 (instead of advertiser server(s)). In some examples, the verified payment, the created Ai/c coins (i.e., the linked Ai coin(s) and Ac coin(s)), and the credited Ai coins may be recorded on distributed ledger 210.

At step 608, A-exchange 208 may generate an ad notification and transmit the ad notification to first mobile consumer device 108-1. In some examples, the ad notification may include one or more digital advertisements including multimedia content (e.g., video(s), audio, etc.) In some examples, A-exchange 208 may communicate with consumer A-coin application 306 of first mobile consumer device 108-1.

At step 610, the consumer, via first mobile consumer device 108-1, may consume at least a portion of the content of the digital advertisement(s) in the received ad notification, thereby consuming data of the consumer's data subscription plan (associated with mobile network operator(s) (MNO) 114.) At step 612, consumption of the portion of the digital advertisement content may cause the amount of available data for first mobile consumer device 108-1 to be reduced in accordance with the amount of data consumed.

At step 614, platform 102 (e.g., A-treasury 206) may receive an indication that at least a portion of the digital advertisement(s) content has been consumed by first mobile consumer device 108-1. For example, consumer A-coin application 306 of first mobile consumer device 108-1 may detect consumption of the multimedia ad content as well as an amount of the content consumed (for example, consumption of all two or more digital advertisements, consumption of one of two or more digital advertisements, consumption of a portion of one digital advertisement, etc.). A-treasury 206 may receive a consumption indication from consumer A-coin application 306 indicating at least partial (or full) consumption of the digital advertisement(s) in the ad notification.

At step 616, A-treasury 206 may validate the consumption of the digital advertisement(s) based at least on the consumption indication received from first mobile consumer device 108-1. At step 620, A-reserve 204 may also transmit Ac coin(s) to first mobile consumer device 108-1. At step 622, the Ac coin(s) may be stored in consumer digital wallet 302 of first mobile consumer device 108-1. For example, A-reserve 204 may transfer Ac coin(s) from platform digital wallet 212 to consumer digital wallet 302. At step 624, platform 102 may record the transfer of Ac coin(s) and Ai coin(s) on distributed ledger 210.

At optional step 626, first mobile consumer device 108-1 may generate a request to refill a data subscription associated of first mobile consumer device 108-1, and transmit the refill request to mobile network operator(s) 114. For example, a consumer of first mobile consumer device 108-1 may generate the request via operation of data plan application 304 on GUI 308. At optional step 628, mobile network operator(s) 114, responsive to the refill request, may determine to refill the data subscription plan of first mobile consumer device 108-1.

At optional step 630, first mobile consumer device 108-1 may transfer one or more Ac coins to mobile consumer device 108-2. For example, first mobile consumer device 108-1 and second mobile consumer device 108-2 may communicate electronically and agree to transfer one or more Ac coins from first mobile consumer device 108-1. to second mobile consumer device 108-2. The Ac coins may be transferred from (first) consumer digital wallet 302 of first mobile consumer device 108-1. At optional step 632, the transferred Ac coins may be stored in (second) consumer digital wallet 302 of second mobile consumer device 108-2. In some examples, first mobile consumer device 108-1 may communicate with platform 102 to indicate the transfer of Ac coins to second mobile consumer device 108-2. In some examples, A-exchange 208 may control the transfer of Ac coins from first mobile consumer device 108-1 to second mobile consumer device 108-2. In some examples, platform 102 may record the change of ownership of the transferred Ac coins on distributed ledger 210.

FIG. 7 illustrates a signal flow diagram of an example method of performing an A-coin transaction between first mobile consumer device 108-1 and owner device 110 of the corresponding Ai coin (e.g., a brand owner) of the transaction associated with digital coin exchange environment 100 shown in FIG. 1, according to an aspect of the present disclosure. At step 702, first mobile consumer device 108-1 may initiate an A-coin transaction for one or more brand items/services with owner device 110. For example, the consumer of first mobile consumer device 108-1 may activate consumer A-coin application 306 and indicate initiation of an Ac coin transaction. Application 306 may communicate with A-coin scanner 402 of owner device 110. In some examples, the A-coin transaction may be initiated via a contactless transaction (e.g., via nearfield communication).

At step 704, A-coin scanner 402 of owner device 110 may scan consumer digital wallet 302 of first mobile consumer device 108-1, and at step 706, A-coin scanner 402 may detect one or more Ac coins in consumer digital wallet 302. At step 708, owner device 110, for example, via merchant A-coin application 406, may match the detected Ac coin(s) with Ai coin(s) associated with the brand. At step 710, when owner device 110 matches the Ac coin(s) with the Ai coin(s), owner device 110 may complete the transaction, for example, via payment application 404. For example, owner device 110 may use the Ac coin(s) to at least partially or fully pay for the brand item(s)/services selected for purchase by the consumer. At step 712, owner device 110 may transfer the Ac coin(s) for the transaction from consumer digital wallet 302 to owner device 110, thereby updating consumer digital wallet 302.

At step 714, owner device 110 may transmit a transaction notification to platform 102, for example to A-treasury 206 of platform 102. The transaction notification may include information relating to the transaction, including, for example, the Ai coin(s) used, the Ac coin(s) used to include the number of Ac coins used, the parties of the transaction, etc.

At step 716, A-treasury 206 may record the transaction, Ac coin and Ai coin information in distributed ledger 210. At step 718, A-reserve 204 may retire the Ai coin and Ac coin. At step 720, a predetermined percentage of A-coins may be transmitted from platform 102 to one or more of media agency server(s) 106.

FIG. 8 illustrates a signal flow diagram of an example method of performing an A-coin transaction between first mobile consumer device 108-1 and third-party buyer device 112 (not associated with the corresponding Ai coin of the transaction), associated with digital coin exchange environment 100 shown in FIG. 1, according to another aspect of the present disclosure. At step 802, first mobile consumer device 108-1 may initiate an A-coin transaction for one or more non-brand items/services associated with brand Ai coin, with third party buyer device 112. Step 802 is similar to step 702, except that, in step 802, first mobile consumer device 108-1 initiates a transaction with third party buyer device 112. Third party buyer device 112 may participate in A-coin exchange but is not associated with brand Ai coins and does not own any brand Ai coins.

At step 804, A-coin scanner 502 of third party buyer device 112 may scan consumer digital wallet 302 of first mobile consumer device 108-1, and at step 806, A-coin scanner 502 may detect one or more Ac coins in consumer digital wallet 302.

At step 808, third party buyer device 112, for example, via merchant A-coin application 506, may transmit a request to A-exchange 208 to buy matching Ai coin(s) that are linked to the Ac coin(s). At step 810, A-exchange 208 may generate and transmit a request to owner device 110, to sell one or more Ai coin(s), responsive to the buy request from third party buyer device 112. For example, A-exchange 208 may determine the Ai coin linked to the Ac coin indicated in the buy request and may identify the brand owner of the Ai coin linked to the Ac coin, based on review of distributed ledger 212. A-exchange 208 may then generate the sell request for transmission to owner device 110.

At step 812, owner device 110, e.g., via merchant A-coin application 406, may agree to sell one or more Ai coins to third party buyer device 112 and may transmit a sell confirmation to A-exchange 208. The sell confirmation may include a sell indication indicating a payment amount for selling the Ai coin, in order for third party buyer device 112 to "buy the rights" to the brand Ai coins (that the consumer is paying with). In some examples, the sell confirmation may also include one or more identification markers of the Ac coins, for purchasing the corresponding Ai coins in A-exchange 208. In some examples, A-exchange may transmit a further message to third party buyer device 112 requesting confirmation to complete buy request based on the sell indication in the sell confirmation message. At step 814, A-exchange 208 may transmit the Ai coin(s) to third party buyer device 112 (for example, responsive to the sell confirmation or after further affirmation from third party buyer device 112 to complete the buy request). In some examples, A-treasury 206 may record the transactions between owner device 110 and third-party buyer device 112 via A-exchange 208, and the transferred Ai coin on distributed ledger 210.

At step 816, third party buyer device 112, for example, via merchant A-coin application 506, may match the detected Ac coin(s) with the received Ai coin(s) (associated with the brand). At step 818, when third party buyer device 112 matches the Ac coin(s) with the Ai coin(s), third party buyer device 112 may complete the transaction, for example, via payment application 504. For example, third party buyer device 112 may use the Ac coin(s) to at least partially or fully pay for the non-brand item(s)/services selected for purchase by the consumer. At step 820, third party buyer device 112 may transfer the Ac coin(s) for the transaction from consumer digital wallet 302 to third party buyer device 112, thereby updating consumer digital wallet 302.

Platform 102 may then repeat steps 716-718 (FIG. 7), responsive to the transaction notification, to record the transaction, Ai coin(s) and Ac coin(s) information in distributed ledger 210 and retire the Ai coin and Ac coin. At step 824, a predetermined percentage of A-coins may be transmitted from platform 102 to one or more of media agency server(s) 106.

In general, FIGS. 6-8 may be illustrated with respect to an example brand Papa John's®. First, advertiser(s) for Papa John's® may develop digital advertisement(s), and may send the digital advertisement(s) along with money for a campaign to A-con platform 102. The campaign funds may be handled by A-treasury 206, and the digital advertisements may be handled by A-exchange 208 in return for Ai coins, which are printed by A-mint 202.

In one embodiment, A-exchange 208 may send the digital advertisements to first mobile consumer device 108-1. Once the consumer has watched the Papa John's° digital advertisement in full (using the consumer's data) and, in some examples, answered at least one anti-bot question, the user may be credited with the Ac coins, via a (e.g., blockchain) digital wallet 302. The consumer may watch enough advertisements to reach a point where the consumer can use the accumulated Ac coins to buy Papa John's® pizza using the Ac coins. (See FIG. 6).

When the consumer goes to Papa John's®, via owner device 110, consumer digital wallet 302 may be scanned at a cashier (e.g., via A-coin scanner 402) and Papa John's° (via owner device 110) matches the consumer Ac coins with their (advertiser) Ai coins. The match of the Ai and Ac coins validates the consumer on a level beyond the consumer's digital blockchain (or any other distributed ledger) wallet 302 from the side of owner device 110. (See FIG. 7).

Consumer may also use the Ac coins for viewing Papa Johns® advertisement(S) to buy non-brand Domino's®. When the consumer goes to Domino's® to buy pizza with the Ac coins, the consumer, without A-exchange 208, may not be able to complete such a purchase because Dominos® does not have any corresponding Ai coins (which would be unfortunate for the consumer who cannot have his favorite pizza and Domino's° as they will lose a customer). To prevent this outcome, Domino's° may communicate with A-Exchange 208 to pay for Papa John's® corresponding Ai coins. The consumer can now use his Ai coins to buy Dominos® pizza. All coins are matched with each other and are retired in A-reserve 204.

The following scenarios depict a few illustrative examples of (but are not limited to) digital coin exchange environment 100. Chocolates.com starts a video advertisement campaign using A-coin. A-coin platform 102 may credit Chocolates.com one or more A-coins for their campaign. A-coin platform 102 may transmit video advertisements. Below depict two examples of how Bob, Allice and Joe may use A-coin(s) for transactions.

Bob is sent a Chocolates.com video advertisement that he watches fully. He is credited Ac coin for his effort. Bob goes to a Chocolates.com store to buy chocolate for himself. At checkout, Bob uses his Ac coin to receive a discount on the chocolates he wants to buy. Chocolates.com validates that Bob has Ac coin and that his Ac coin(s) are from their video advertisement campaign. Bob pays for the chocolate after receiving the discount and leaves the store. Both Bob's Ac coin(s) and Chocolates.com's Ai coin(s) are then retired from A-coin platform 102.

Allice is sent a Chocolates.com video advertisement that she watches fully. She is credited Ac coin(s) for her effort. Allice goes to a Flowers.com store to buy flowers for her garden. At checkout, Allice uses her Ac coin(S) to receive a discount on the flowers she wants to buy. Flowers.com validates that Allice has Ac coin(s) and detects that her Ac coin(s) do not match their video advertisement campaign. Flowers.com goes to A-exchange 208 of A-coin platform 102 to purchase Chocolates.com's Ai coin(s). Chocolates.com sells the amount of Ai coin(s) Allice wants to use to Flowers.com, via A-exchange 208. Allice pays for the flowers after receiving the discount and leaves the store. Both Allice's and Chocolates.com's A-coins are then retired from A-coin platform 102.

Joe is sent a Chocolates.com video advertisement that he watches fully. He is credited Ac coin(s) for his effort. Joe goes to a Food.com store to buy food for his home. At checkout, Joe uses his Ac coin(s) to receive a discount on the food he wants to buy. Food.com validates that Joe has Ac coin(s), but Food.com has never sent video advertisement campaigns with A-coin platform 102. Food.com goes to A-exchange 208 to purchase Chocolates.com's Ai coin(s). Chocolates.com sells the amount of Ai coin(s) Joe wants to use to Food.com. Joe pays for the food after receiving the discount and leaves the store. Both Joe's Ac coin(s) and Chocolates.com's Ai coin(s) are then retired from A-coin platform 102.

The above scenario depicts non-limiting example consumer to brand transactions. The below non-limiting example scenario depicts user to user transactions.

Joe has used all his Ac coin(s) that he received from Chocolates.com. Allice is happy because she has a plentiful amount of Ac coin(s) in her digital wallet 302. Joe approaches Allice to transact an amount of Ac coin(s). Allice is willing to part with the amount of A-coins Joe has requested. Joe sends his request for Allice's A-coins. Joe's request also compensates Allice's effort in gaining A-coins by including the amount of data it took to gain the A-coins he has requested.

It is understood that other more involved transaction use-cases are also applicable and may follow from the A-coin platform 102 and digital coin exchange environment 100 framework described herein.

Systems and methods of the present disclosure may include and/or may be implemented by one or more specialized computers or other suitable components including specialized hardware and/or software components. For purposes of this disclosure, a specialized computer may be a programmable machine capable of performing arithmetic and/or logical operations and specially programmed to perform the functions described herein. In some embodiments, computers may comprise processors, memories, data storage devices, and/or other commonly known or novel components. These components may be connected physically or through network or wireless links. Computers may also comprise software which may direct the operations of the aforementioned components. Computers may be referred to with terms that are commonly used by those of ordinary skill in the relevant arts, such as servers, personal computers (PCs), mobile devices, and other terms. It will be understood by those of ordinary skill that those terms used herein are interchangeable, and any special purpose computer specifically configured to perform the described functions may be used.

Computers may be linked to one another via one or more networks. A network may be any plurality of completely or partially interconnected computers wherein some or all of the computers are able to communicate with one another. It will be understood by those of ordinary skill that connections between computers may be wired in some cases (e.g., via wired TCP connection or other wired connection) and/or may be wireless (e.g., via a WiFi network connection). Any connection through which at least two computers may exchange data can be the basis of a network. Furthermore, separate networks may be able to be interconnected such that one or more computers within one network may communicate with one or more computers in another network. In such a case, the plurality of separate networks may optionally be considered to be a single network.

The term "computer" shall refer to any electronic device or devices, including those having capabilities to be utilized in connection with digital coin exchange system, such as any device capable of receiving, transmitting, processing and/or using data and information. The computer may comprise a server, a processor, a microprocessor, a personal computer, such as a laptop, palm PC, desktop or workstation, a network server, a mainframe, an electronic wired or wireless device, such as for example, a cellular telephone, a personal digital assistant, a smartphone, or any other computing and/or communication device.

The term "network" shall refer to any type of network or networks, including those capable of being utilized in connection with digital coin exchange environment 100 described herein, such as, for example, any public and/or private networks, including, for instance, the Internet, an intranet, or an extranet, any wired or wireless networks or combinations thereof.

The term "computer-readable storage medium" should be taken to include a single medium or multiple media that store one or more sets of instructions. The term "computer-readable storage medium" shall also be taken to include any medium that is capable of storing or encoding a set of instructions for execution by the machine and that causes the machine to perform any one or more of the methodologies of the present disclosure.

FIG. 9 illustrates a functional block diagram of a machine in the example form of computer system 900 within which a set of instructions for causing the machine to perform any one or more of the methodologies, processes or functions discussed herein may be executed. In some examples, the machine may be connected (e.g., networked) to other machines as described above. The machine may operate in the capacity of a server or a client machine in a client-server network environment, or as a peer machine in a peer-to-peer (or distributed) network environment. The machine may be any special-purpose machine capable of executing a set of instructions (sequential or otherwise) that specify actions to be taken by that machine for performing the functions describe herein. Further, while only a single machine is illustrated, the term "machine" shall also be taken to include any collection of machines that individually or jointly execute a set (or multiple sets) of instructions to perform any one or more of the methodologies discussed herein. In some examples, A-coin platform 102, advertiser server(s) 104, media agency server(s) 106, consumer device(s) 108, owner device 110, third party buyer device 112 and/or mobile network operator(s) 114 (FIG. 1) may be implemented by the example machine shown in FIG. 9 (or a combination of two or more of such machines).

Example computer system 900 may include processing device 902, memory 906, data storage device 910 and communication interface 912, which may communicate with each other via data and control bus 918. In some examples, computer system 900 may also include display device 914 and/or user interface 916.

Processing device 902 may include, without being limited to, a microprocessor, a central processing unit, an application specific integrated circuit (ASIC), a field programmable gate array (FPGA), a digital signal processor (DSP) and/or a network processor. Processing device 902 may be configured to execute processing logic 904 for performing the operations described herein. In general, processing device 902 may include any suitable special-purpose processing device specially programmed with processing logic 904 to perform the operations described herein.

Memory 906 may include, for example, without being limited to, at least one of a read-only memory (ROM), a random access memory (RAM), a flash memory, a dynamic RAM (DRAM) and a static RAM (SRAM), storing computer-readable instructions 908 executable by processing device 902. In general, memory 906 may include any suitable non-transitory computer readable storage medium storing computer-readable instructions 908 executable by processing device 902 for performing the operations described herein. For example, computer-readable instructions 908 may include operations performed by components 202-218 (of A-coin platform 102, shown in FIG. 2), data plan module 304 and consumer A-coin application 306 (of mobile consumer device(s) 108), shown in FIG. 3), payment application 404 with merchant A-coin application 406 (of owner device 110, shown in FIG. 4) or payment application 504 with merchant A-coin application 506 (of third party buyer device 112, shown in FIG. 5). Although one memory device 906 is illustrated in FIG. 9, in some examples, computer system 900 may include two or more memory devices (e.g., dynamic memory and static memory).

Computer system 900 may include communication interface device 912, for direct communication with other computers (including wired and/or wireless communication) and/or for communication with a network. In some examples, computer system 900 may include display device 914 (e.g., a liquid crystal display (LCD), a touch sensitive display, etc.). In some examples, computer system 900 may include user interface 916 (e.g., an alphanumeric input device, a cursor control device, etc.).

In some examples, computer system 900 may include data storage device 910 storing instructions (e.g., software) for performing any one or more of the functions described herein. Data storage device 910 may include any suitable non-transitory computer-readable storage medium, including, without being limited to, solid-state memories, optical media and magnetic media.

While the present disclosure has been discussed in terms of certain embodiments, it should be appreciated that the present disclosure is not so limited. The embodiments are explained herein by way of example, and there are numerous modifications, variations and other embodiments that may be employed that would still be within the scope of the present disclosure.

The invention claimed is:

1. A system for digital coin exchange, the system comprising:
   at least one entity server associated with an entity;
   at least one device comprising a digital coin application; and
   a digital coin platform communicatively coupled to the at least one entity server and the at least one device via at least one network, the digital coin platform comprising at least one computer including non-transitory memory storing computer readable instructions and at least one processor configured to execute the computer readable instructions, the digital coin platform configured to:
- receive, via the at least one network, a distribution request from the at least one entity server, the distribution request comprising digital content associated with the entity,
- create, responsive to the distribution request, one or more digital coins, each digital coin comprising at least one first coin associated with the entity and at least one second coin associated with one or more other entities, the at least one first coin having a first identifier, the at least one second coin having a second identifier, the at least one first coin linked to the at least one second coin via a third identifier indicating linking information,
- store the created one or more digital coins in a storage reserve of the digital coin platform,
- transmit one or more first coins of the at least one first coin from the storage reserve to the at least one entity server,
- transmit, via the at least one network, to the at least one device, a consumption request including the digital content,
- receive, via the at least one network, an indication that the digital content is at least partially consumed via the at least one device, the indication generated by the digital coin application on the at least one device responsive to the digital coin application detecting consumption of the digital content on the at least one device,
- responsive to receiving the indication that the digital content is at least partially consumed via the at least one device, transmit one or more second coins of the least one second coin from the storage reserve to the at least one device, the transmitted one or more second coins being stored in a digital wallet of the at least one device, and
- record, on the digital coin platform, the created one or more digital coins, the transmitted second coins, and the transmitted first coins, wherein the transmitted second coins permit the at least one device to perform transactions a) with a first transaction device associated with the entity and the at least one first coin, and b) with a second transaction device associated with a further entity different from the entity and not associated with the at least one first coin, the first transaction device comprising a first coin scanner application integrated with a first payment application, the second transaction device comprising a second coin scanner application integrated with a second payment application, wherein:
when the at least one device initiates a first digital transaction with the first transaction device for at least one item associated with the entity, the first transaction device is configured to detect the one or more second coins stored in the at least one device via the first coin scanner application, match the detected one or more second coins stored in the at least one device to the at least one first coin based on the third identifier, and to complete the first digital transaction via the first payment application with the detected one or more second coins responsive to the match, and
when the at least one device initiates a second digital transaction with the second transaction device for at least one item associated with the further entity, the second transaction device is configured to detect the one or more second coins stored in the at least one device via the second coin scanner application, obtain a portion of the at least one first coin based on a transaction with the first transaction device via the digital coin platform, match the detected one or more second coins stored in the at least one device to the obtained portion of the least one first coin based on the third identifier, and to complete the second digital transaction via the second payment application with the detected one or more second coins responsive to the match.

2. The system of claim 1, wherein the digital coin platform includes a distributed ledger and a platform digital wallet, the digital coin platform being configured to record the created one or more digital coins, the transmitted second coins, and the transmitted first coins on the distributed ledger, and the digital coin platform being configured to transmit the one or more second coins from said platform digital wallet to the digital wallet of the at least one device.

3. The system of claim 1, wherein:
the at least one device is configured to consume one or more data resources associated with a predetermined data subscription service of a mobile network operator, responsive to the at least partially consumed digital content.

4. The system of claim 3, wherein the mobile network operator comprises at least one of a private mobile network operator, a mobile virtual network operator and a public mobile network operator.

5. The system of claim 1, wherein the digital coin platform is part of an edge Internet architecture and includes a Mobile Edge Computing (MEC) platform for connectivity.

6. The system of claim 1, wherein the first transaction device is configured to:
complete the first digital transaction using at least a portion of the detected one or more second coins, responsive to the match, and
transmit a transaction notification to the digital coin platform indicating the completed first digital transaction.

7. The system of claim 6, wherein the digital coin platform is configured to retire the portion of the detected one or more second coins and the at least one first coin involved in the first digital transaction, responsive to the transaction notification from the first transaction device.

8. The system of claim 1, wherein the second transaction device is configured to:
transmit a request to the digital coin platform to purchase a portion of the at least one first coin, responsive to the detected one or more second coins,
receive the requested portion of the at least one first coin from the digital coin platform, the digital coin platform providing said requested portion responsive to a communication between the digital exchange platform and the first transaction device to sell the requested portion from the first transaction device, thereby forming the transaction with the first transaction device,
complete the second digital transaction using at least a portion of the detected one or more second coins, responsive to the match, and
transmit a transaction notification to the digital coin platform indicating the completed second digital transaction, the digital coin platform configured to retire the portion of the detected one or more second coins and the at least one first coin involved in the second digital transaction, responsive to the transaction notification.

9. The system of claim 1, the system further including a further device, the at least one device configured to transmit at least a portion of the one or more second coins to the further device.

10. The system of claim 1, wherein the digital coin platform is configured to at least one of track the at least one first coin, track the at least one second coin and monitor transactions associated with at least one second coin.

11. The system of claim 1, wherein the digital coin platform is configured to determine a number of coins of the at least one second coin to transmit to the at least one device based on a location of the at least one device during said transmit and a data consumption cost for the location.

12. A method for digital coin exchange, the method comprising:
   providing a digital coin platform communicatively coupled to at least one network, the digital coin platform comprising at least one computer including non-transitory memory storing computer readable instructions and at least one processor configured to execute the computer readable instructions;
   receiving, by the digital coin platform, via the at least one network, a distribution request from at least one entity server associated with an entity, the distribution request comprising digital content associated with the entity;
   creating, by the digital coin platform, responsive to the distribution request, one or more digital coins, each digital coin comprising at least one first coin associated with the entity and at least one second coin associated with one or more other entities, the at least one first coin having a first identifier, the at least one second coin having a second identifier, the at least one first coin linked to the at least one second coin via a third identifier indicating linking information;
   storing, by the digital coin platform, the created one or more digital coins in a storage reserve of the digital coin platform;
   transmitting, by the digital coin platform, one or more first coins of the at least one first coin from the storage reserve to the at least one entity server;
   transmitting, by the digital coin platform, via the at least one network, to at least one device, a consumption request including the digital content, the at least one device comprising a digital coin application;
   receiving, by the digital coin platform, via the at least one network, an indication that the digital content is at least partially consumed via the at least one device, the indication generated by the digital coin application on the at least one device responsive to the digital coin application detecting consumption of the digital content on the at least one device;
   responsive to receiving, by the digital coin platform, the indication that the digital content is at least partially consumed via the at least one device:
      transmitting, by the digital coin platform, one or more second coins of the least one second coin from the storage reserve to the at least one device, the transmitted one or more second coins being stored in a digital wallet of the at least one device; and
      recording, on the digital coin platform, the created one or more digital coins, the transmitted second coins, and the transmitted first coins,
   wherein the transmitted second coins permit the at least one device to perform transactions a) with a first transaction device associated with the entity and the at least one first coin, and b) with a second transaction device associated with a further entity different from the entity and not associated with the at least one first coin, the first transaction device comprising a first coin scanner application integrated with a first payment application, the second transaction device comprising a second coin scanner application integrated with a second payment application,
   wherein:
   when the at least one device initiates a first digital transaction with the first transaction device for at least one item associated with the entity, the method further comprises:
      detecting, by the first coin scanner application of the first transaction device, the one or more second coins stored in the at least one device,
      matching, by the first transaction device, the detected one or more second coins stored in the at least one device to the at least one first coin based on the third identifier, and
      completing, by the first payment application of the first transaction device, the first digital transaction with the one or more second coins responsive to the match, and
   when the at least one device initiates a second digital transaction with the second transaction device for at least one item associated with the further entity, the method further comprises:
      detecting, by the second coin scanner application of the second transaction device, the one or more second coins stored in the at least one device,
      obtaining, by the second transaction device, a portion of the at least one first coin based on a transaction with the first transaction device via the digital coin platform,
      matching, by the second transaction device, the one or more second coins stored in the at least one device to the obtained portion of the least one first coin based on the third identifier, and
      completing, by second payment application of the second transaction device, the second digital transaction with the one or more second coins responsive to the match.

13. The method of claim 12, wherein the transmitting of the one or more second coins includes transmitting the one or more second coins from a platform digital wallet of the digital coin platform to the digital wallet of the at least one device.

14. The method of claim 12, the method further comprising:
   consuming, by the at least one device, one or more data resources associated with a predetermined data subscription service of a mobile network operator, responsive to the at least partially consumed digital content.

15. The method of claim 14, the method further comprising, refilling, by the at least one device, the consumed one or more data resources of the predetermined data subscription service, via the mobile network operator.

16. The method of claim 12, the method further comprising, when the at least one device initiates the first digital transaction with the first transaction device:
   completing, by the first transaction device, the first digital transaction using at least a portion of the detected one or more second coins, responsive to the matching; and
   transmitting, by the first transaction device, a transaction notification to the digital coin platform indicating the completed first digital transaction.

17. The method of claim 16, the method further comprising:
receiving, by the digital coin platform, from the first transaction device, the transaction notification; and
retiring, by the digital coin platform, responsive to the transaction notification, the portion of the detected one or more second coins and the at least one first coin involved in the first digital transaction.

18. The method of claim 12, the method further comprising, when the at least one device initiates the second digital transaction with the second transaction device:
transmitting, by the second transaction device, a request to the digital coin platform to purchase a portion of the at least one first coin, responsive to the detected one or more second coins;
performing, by the digital coin platform, with the first transaction device, the transaction to sell the requested portion from the first transaction device, responsive to the purchase request;
transmitting, by the digital coin platform, to the second transaction device, the requested portion of the at least one first coin, responsive to the transaction with the first transaction device;
completing, by the second transaction device, the digital coin transaction using at least a portion of the detected one or more second coins, responsive to the matching; and
transmitting, by the second transaction device, a transaction notification to the digital coin platform indicating the completed second digital transaction, the digital coin platform configured to retire the portion of the detected one or more second coins and the at least one first coin involved in the second digital transaction, responsive to the transaction notification.

19. The method of claim 12, the method further comprising transmitting, by the at least one device, at least a portion of the one or more second coins to a further device.

20. The method of claim 12, the method further comprising, by the digital coin platform, at least one of tracking the at least one first coin, tracking the at least one second coin and monitoring transactions associated with at least one second coin.

21. The method of claim 12, the method further comprising determining, by the digital coin platform, a number of coins of the at least one second coin to transmit to the at least one device based on a location of the at least one device during said transmit and a data consumption cost for the location.

22. A non-transitory computer readable medium storing computer readable instructions that, when executed by one or more processing devices, cause the one or more processing devices to perform the functions comprising:
receiving, via at least one network, a distribution request from at least one entity server associated with an entity, the distribution request comprising digital content associated with the entity,
creating, responsive to the distribution request, one or more digital coins, each digital coin comprising at least one first coin associated with the entity and at least one second coin associated with one or more other entities, the at least one first coin having a first identifier, the at least one second coin having a second identifier, the at least one first coin linked to the at least one second coin via a third identifier indicating linking information,
storing the created one or more digital coins in a storage reserve;
transmitting, via the at least one network, to at least one device, a consumption request including the digital content, the at least one device comprising a digital coin application,
receiving, via the at least one network, an indication that the digital content is at least partially consumed via the at least one device, the indication generated by the digital coin application on the at least one device responsive to the digital coin application detecting consumption of the digital content on the at least one device;
responsive to receiving the indication that the digital content is at least partially consumed via the at least one device:
transmitting one or more second coins of the least one second coin from the storage reserve to the at least one device the transmitted one or more second coins being stored in a digital wallet of the at least one device, and
transmitting one or more first coins of the at least one first coin from the storage reserve to the at least one entity server, and
recording the created one or more digital coins, the transmitted second coins, and the transmitted first coins,
wherein the transmitted second coins permit the at least one device to perform transactions a) with a first transaction device associated with the entity and the at least one first coin, and b) with a second transaction device associated with a further entity different from the entity and not associated with the at least one first coin, the first transaction device comprising a first coin scanner application integrated with a first payment application, the second transaction device comprising a second coin scanner application integrated with a second payment application,
wherein:
when the at least one device initiates a first digital transaction with the first transaction device for at least one item associated with the entity, the first transaction device is configured to detect the one or more second coins stored in the at least one device via the first coin scanner application, match the detected one or more second coins stored in the at least one device to the at least one first coin based on the third identifier, and to complete the first digital transaction via the first payment application with the detected one or more second coins responsive to the match, and
when the at least one device initiates a second digital transaction with the second transaction device for at least one item associated with the further entity, the second transaction device is configured to detect the one or more second coins stored in the at least one device via the second coin scanner application, obtain a portion of the at least one first coin based on a transaction with the first transaction device via the one or processing devices, match the detected one or more second coins stored in the at least one device to the obtained portion of the least one first coin based on the third identifier, and to complete the second digital transaction via the second payment application with the detected one or more second coins responsive to the match.

23. A system for digital coin exchange, the system comprising:
a digital coin platform comprising at least one computer communicatively coupled to at least one network, the digital coin platform configured to create one or more digital coins and to track the one or more digital coins, each digital coin comprising at least one first coin associated with an entity and at least one second coin, the at least one first coin having a first identifier, the at least one second coin having a second identifier, the at least one first coin linked to the at least one second coin via a third identifier indicating linking information, the at least one second coin for performing digital coin transactions associated with the entity, the created one or more digital coins being stored in a storage reserve of the digital coin platform;

a device comprising a digital coin application, the device configured to store one or more second coins of the at least one second coin received from the storage reserve of the digital coin platform, the device configured to receive the one or more second coins responsive to the digital coin application detecting consumption of digital content associated with the entity on the device, the received one or more second coins being stored in a digital wallet of the device;

a first transaction device associated with the entity and the at least one first coin, the first transaction device comprising a first coin scanner application integrated with a first payment application; and a second transaction device associated with a further entity different from the entity and not associated with the at least one first coin, the second transaction device comprising a second coin scanner application integrated with a second payment application, wherein:

when the device initiates a first digital transaction with the first transaction device for at least one item associated with the entity, the first transaction device is configured to detect the one or more second coins stored in the device via the first coin scanner application, match the detected one or more second coins stored in the device to the at least one first coin based on the third identifier, and to complete the first digital transaction via the first payment application with at least a portion of the detected one or more second coins responsive to the match, and when the device initiates a second digital transaction with the second transaction device for at least one item associated with the further entity, the second transaction device is configured to detect the one or more second coins stored in the device via the second coin scanner application, obtain a portion of the at least one first coin based on a transaction with the first transaction device via the digital coin platform, match the detected one or more second coins stored in the device to the obtained portion of the least one first coin based on the third identifier, and to complete the second digital transaction via the second payment application with at least a portion of the detected one or more second coins responsive to the match.

24. The system of claim 23, wherein the digital coin platform is configured to retire the portion of the detected one or more second coins and the at least one first coin responsive to completion of either the first digital transaction or the second digital transaction.

25. The system of claim 23, the system further including a further device, the device configured to transmit at least a portion of the stored one or more second coins to the further device.

26. The system of claim 23, wherein the digital coin platform is configured to at least one of track the at least one first coin, track the at least one second coin and monitor transactions associated with at least one second coin.

27. The system of claim 23, wherein the digital coin platform is configured to transmit the one or more second coins to the device responsive to an indication from the device indicating the detected consumption of the digital content associated with the entity.

28. The system of claim 27, wherein the digital coin platform transmits the one or more second coins in response to one or more data resources used by the device responsive to consumption of the digital content.

* * * * *